United States Patent

Narushima et al.

[11] Patent Number: 5,823,690
[45] Date of Patent: Oct. 20, 1998

[54] PRINTER APPARATUS

[75] Inventors: Toshio Narushima, Kanagawa; Koichiro Kakinuma, Tokyo; Masao Araya, Kanagawa; Shinichiro Mikami; Junko Ikegami, both of Chiba, all of Japan

[73] Assignee: Sony Corporation, Tokyo, Japan

[21] Appl. No.: 717,605

[22] Filed: Sep. 23, 1996

[30] Foreign Application Priority Data

Sep. 29, 1995 [JP] Japan .................................. 7-254265

[51] Int. Cl.⁶ .................................. B41J 2/05; B41J 2/36
[52] U.S. Cl. .................. 400/120.07; 347/15; 347/17; 347/183; 358/298
[58] Field of Search .................. 400/120.07; 347/5, 347/9, 11, 14, 15, 17; 358/183, 298, 296

[56] References Cited

U.S. PATENT DOCUMENTS

| 5,179,389 | 1/1993 | Arai | 347/14 |
| 5,223,853 | 6/1993 | Wysocui et al. | 347/15 |
| 5,343,231 | 8/1994 | Suzuki | 347/14 |
| 5,387,987 | 2/1995 | Ino | 347/15 |
| 5,517,317 | 5/1996 | Kumada | 358/296 |
| 5,521,621 | 5/1996 | Endo et al. | 347/15 |
| 5,533,816 | 7/1996 | Ikeda et al. | 400/120.07 |
| 5,539,433 | 7/1996 | Kawai et al. | 347/15 |
| 5,552,809 | 9/1996 | Husono et al. | 347/15 |
| 5,557,304 | 9/1996 | Stortz | 347/15 |
| 5,581,281 | 12/1996 | Fuse | 347/17 |
| 5,648,801 | 7/1997 | Beardsley et al. | 358/298 |

*Primary Examiner*—Eugene H. Eickholt
*Attorney, Agent, or Firm*—Hill, Steadman & Simpson

[57] ABSTRACT

A printer apparatus in which a multi-nozzle print head can be produced at low cost and which can deal with changes caused with lapse of time. With the printer apparatus, effective resolution can be improved and a more accurate gradation level in picture printing can be achieved for assuring uniform printing quality. The printer apparatus has a shading correction unit 14 for correcting the picture printing data signal for printing using shading correction data previously found and stored in the EE-PROM 10 and shading correction data entered from a man/machine interfacing unit 2 and for generating a head impression signal for driving a print head 16 based on the corrected picture printing data.

4 Claims, 20 Drawing Sheets

RECORDING SHEET
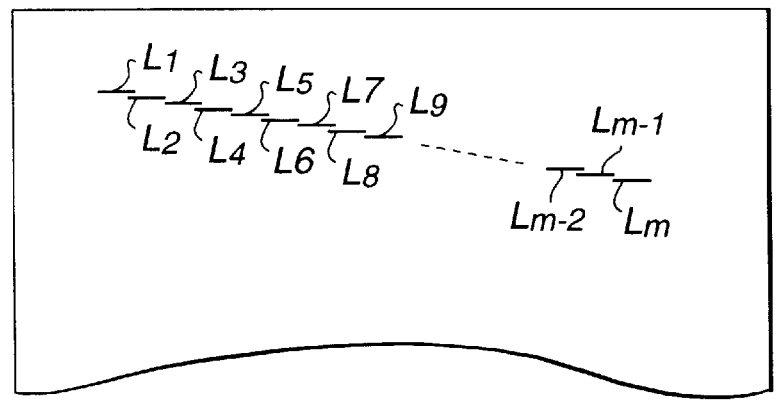
FIG.8
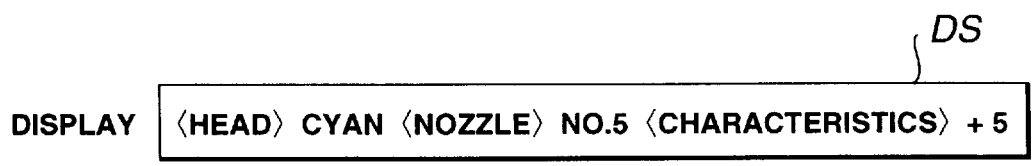
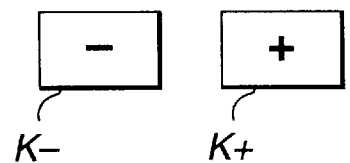
FIG.9

| INPUT LEVEL | DENSITY D(OD) | AREA SATIO A | DOT DIAMETER r(RATIO) | ACTUAL DOT DIAMETER FOR 300 dpi (DOT INTERVAL.80μm) |
|---|---|---|---|---|
| 255 | – | 1.57 | 1.41 | 115μm |
| 204 | 1.50 | 1.00 | 1.12 | 91μm |
| 153 | 1.15 | 0.95 | 1.10 | 90μm |
| 102 | 0.80 | 0.83 | 1.04 | 85μm |
| 50 | 0.45 | 0.58 | 0.86 | 70μm |
| 0 | 0.10 | 0 | 0 | 0 |

(OPTICAL DENSITY OF INK,1.50,OPTICAL DENSITY OF SHEET,0.1)

FIG.11

PRINTER APPARATUS

BACKGROUND OF THE INVENTION

1. Field of the Invention

This invention relates to a printer apparatus capable of varying the ink dot diameter on a recording paper sheet or the mixing density of the ink and a dilution solution for representing the half tone.

2. Description of the Related Art

Among conventional printer apparatus, there is a so-called on-demand type ink jet printer configured for discharging ink liquid droplets via a nozzle responsive to recording signals for recording on a recording medium, such as paper or film sheets. This type of printer is recently coming into widespread use because it lends itself to reduction in size and cost.

On the other hand, computerized document formulation known as desk top publishing has come into use extensively above all in an office. Recently, there is an increasing demand for outputting not only a letter or a figure but also a colored natural image, such as a photograph, along with the letter or the figure. For printing the natural image with high image quality, representation of the half tone is crucial.

In an ink jet printing head used for this on-demand type ink jet printer, a system of employing an electrostrictive oscillator, such as a piezo-element, or a heating element, is generally used as a system for discharging ink liquid droplets. The ink jet printing head is referred to hereinafter as a print head.

the Print head exploiting displacement of the electrostrictive vibrator, such as a piezo element, causes ink liquid droplets to be discharged from the nozzle by deforming the piezo element for thereby pressurizing the ink.

As the printer head utilizing displacement of the electrostrictive vibrator, such as the piezo-element, there is so far known such a printer head having a structure of, for example, a vibrating cylinder type, a flat plate vibrating type or a "stemme" type printer had.

Referring to FIG. 1, a flat plate vibrating type printer head, for example, includes a flat plate type electrostrictive vibrator 517, a vibrating plate 518 bonded to the flat plate type electrostrictive vibrator 517 for constituting a so-called bimorph element, a nozzle unit 511 having the bimorph element, an ink chamber 515 defined by the interior of the nozzle unit 511, an ink supply port 514 fed with ink charged into the ink chamber 515, a nozzle 513 and an orifice 516 for discharging the ink as ink liquid droplets 519, and a voltage generator for generating a voltage applied across the bimorph element. The ink droplets 519 are discharged due to volumetric changes in the ink chamber 515 produced by applying the voltage from the voltage generator 512 across the bimorph element.

In the printer head of the on-demand type ink jet printer, the above-described system of employing the heating element, among the systems for emitting the ink liquid droplets, discharges the ink liquid droplets by taking advantage of the phenomenon of vaporization of the ink solution caused by the heating element.

Referring to FIGS. 2A to 2D, the printer head employing the heating element is designed and constructed so that an electric power is applied to a heating element 537 provided in a nozzle 533 provided in a nozzle unit 531 for instantly vaporizing the ink in the nozzle 533 under the resulting heat energy for discharging ink droplets 539 from an orifice 536 under volumetric changes produced under the pressure of bubbles produced due to ink vaporization.

The liquid ink droplets in the printer head employing the heating element are discharged by the following sequence of operations: If the power is applied across the heating element 537, the ink in contact with the heating element 537 is heated to ebullition to form a large number of small-sized bubbles, as shown in FIG. 2A. These small-sized bubbles coalesce to a large-sized bubble 540 and the ink in the nozzle 533 is extruded from the orifice unit 536 under the abrupt pressure rise in the bubble 540, as shown in FIG. 2B. The power supply to the heating element 537 is then discontinued. This diminishes the size of the bubble 540 abruptly such that the pressure in the nozzle 533 is decreased abruptly, as shown in FIG. 2C. The ink extruded from the orifice 536 is separated in this manner from the ink within the nozzle 533 so as to be discharged as the liquid ink droplet 539 as shown in FIG. 2D.

If, in the above-described on-demand type ink jet printer, the half tone is to be represented, the voltage applied to the electrostrictive vibrator, such as the piezo-electric element, or the heating element, or the pulse width, is changed for varying the size of the printing dot formed on the recording sheet for representing the gradation. Alternatively, each pixel is constituted by, for example, a 4×4 dot matrix, without varying the picture printing dot diameter, and gradation is represented using a so-called dither method on the matrix basis.

Meanwhile, the above-described conventional on-demand type ink jet printer is frequently constructed by a so-called multi-nozzle structure in which plural nozzles are arranged within a nozzle unit of the printer head.

In the multi-nozzle structure, it occurs frequently that the effective resolution becomes lower than the theoretically feasible resolution, as a result of manufacture tolerances of the respective nozzles, while the picture printing gradation level becomes inaccurate such that printing with uniform printing quality cannot be achieved. In addition, similar problems arise due to deterioration of the nozzle in use with lapse of time. There is also constraint imposed on the individual nozzle structure due to the necessity of reducing the adverse effects caused by deterioration with lapse of time. In addition, it is necessary to make strict control on the characteristics of the ink in use, thus unavoidably raising the cost.

SUMMARY OF THE INVENTION

It is therefore an object of the present invention to provide a printer apparatus in which a multi-nozzle printing head can be produced inexpensively.

It is another object of the present invention to provide a printer apparatus in which effective resolution can be raised and the picture printing gradation level can be set accurately to assure picture printing of uniform quality.

It is yet another object of the present invention to provide a printer apparatus in which deterioration with lapse of time can be successfully coped with.

The present invention provides a printer apparatus for printing a half-tone picture by varying the diameter of an ink dot formed on a recording medium having a plurality of pressure chambers into which the ink is introduced, a plurality of nozzles communicating with these pressure chambers, a plurality of pressurizing means responsive to the picture printing signal for pressurizing the ink in the pressure chambers, and correction means for correcting the picture printing signal associated with each of the pressurizing means.

The present invention also provides a printer apparatus for printing a half-tone picture by varying the diameter of an ink dot formed on a recording medium having a plurality of first pressure chambers into which is introduced a medium for emission, a plurality of second pressure chambers into which is introduced a medium for quantitation, a plurality of first nozzles communicating with said first pressure chamber, a plurality of second nozzles communicating with said second pressure chamber, a plurality of first pressurizing means for pressurizing the medium for emission in said first pressure chamber responsive to a picture printing signal, a plurality of second pressurizing means for pressurizing the medium for quantitation in said second pressure chamber responsive to a picture printing signal, and correction means for correcting a picture printing signal associated with each of the first and second plural pressurizing means.

More specifically, the present invention provides a printer apparatus in which the diameter of the ink dot formed on the recording medium is varied for printing a half-tone picture or a printer apparatus in which the mixing density of the medium for emission and the medium for quantitation is varied for printing a half-tone picture, in which the picture printing signal is varied responsive to fluctuations caused during manufacture and with lapse of time of the plural nozzles and plural pressurizing means for correcting the picture printing signal.

Thus the printer apparatus of the present invention corrects the picture printing signal responsive to fluctuations caused in the nozzles and the pressurizing means during manufacture and with lapse of time. The result is that the multi-nozzle print head may be produced at lower cost and effective resolution may be improved, while a more accurate picture printing gradation level and uniform printing quality may be achieved and deterioration of the nozzles with lapse of time can be successfully coped with.

BRIEF DESCRIPTION OF THE DRAWINGS

FIG. 8 illustrates a picture printing sample for shading correction.

FIG. 9 illustrates an example of entry of a correction value of the shading correction data from a man/machine interfacing unit.

FIG. 11 illustrates the input levels, optical density, ink area ratio and an actual dot diameter for a dot interval of 80 $\mu$m.

DESCRIPTION OF THE PREFERRED EMBODIMENTS

Figure 1:
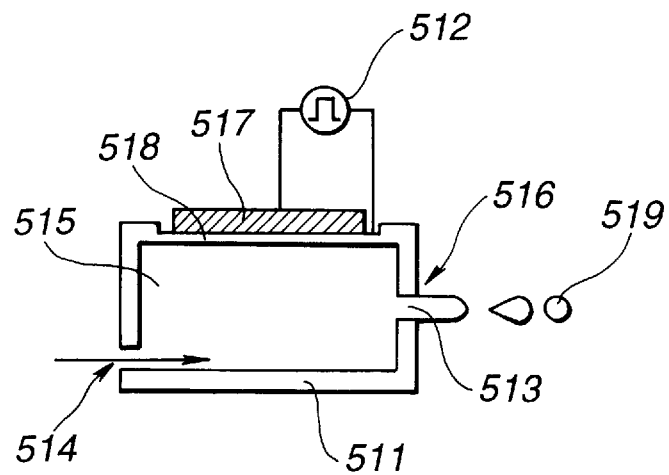
FIG. 1 shows a basic arrangement of a flat plate vibrator type print head.
Figure 2A:
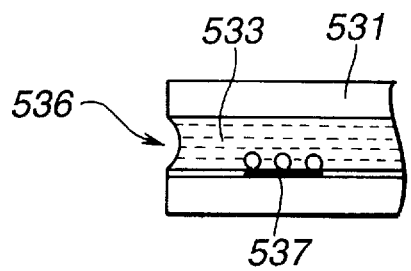
FIGS. 2A, 2B, 2C and 2D illustrate a basic arrangement of a heating evaporation type print head.
Figure 2B:
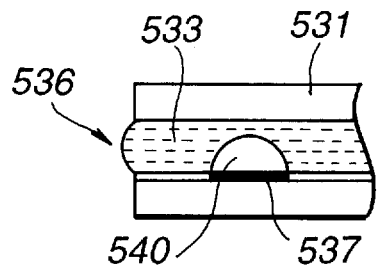
Figure 2C:
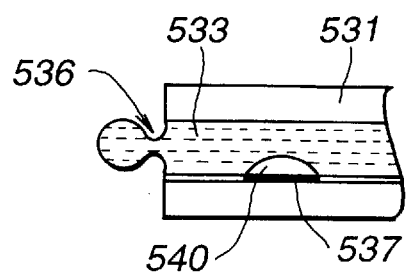
Figure 2D:
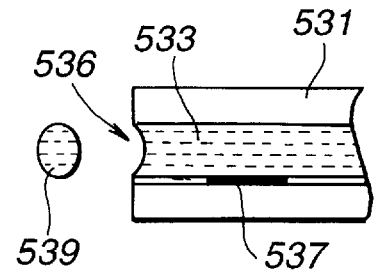

Referring to the drawings, preferred embodiments of the present invention will be explained in detail.

First, a printer apparatus according to a first embodiment of the present invention is explained.

Figure 3:
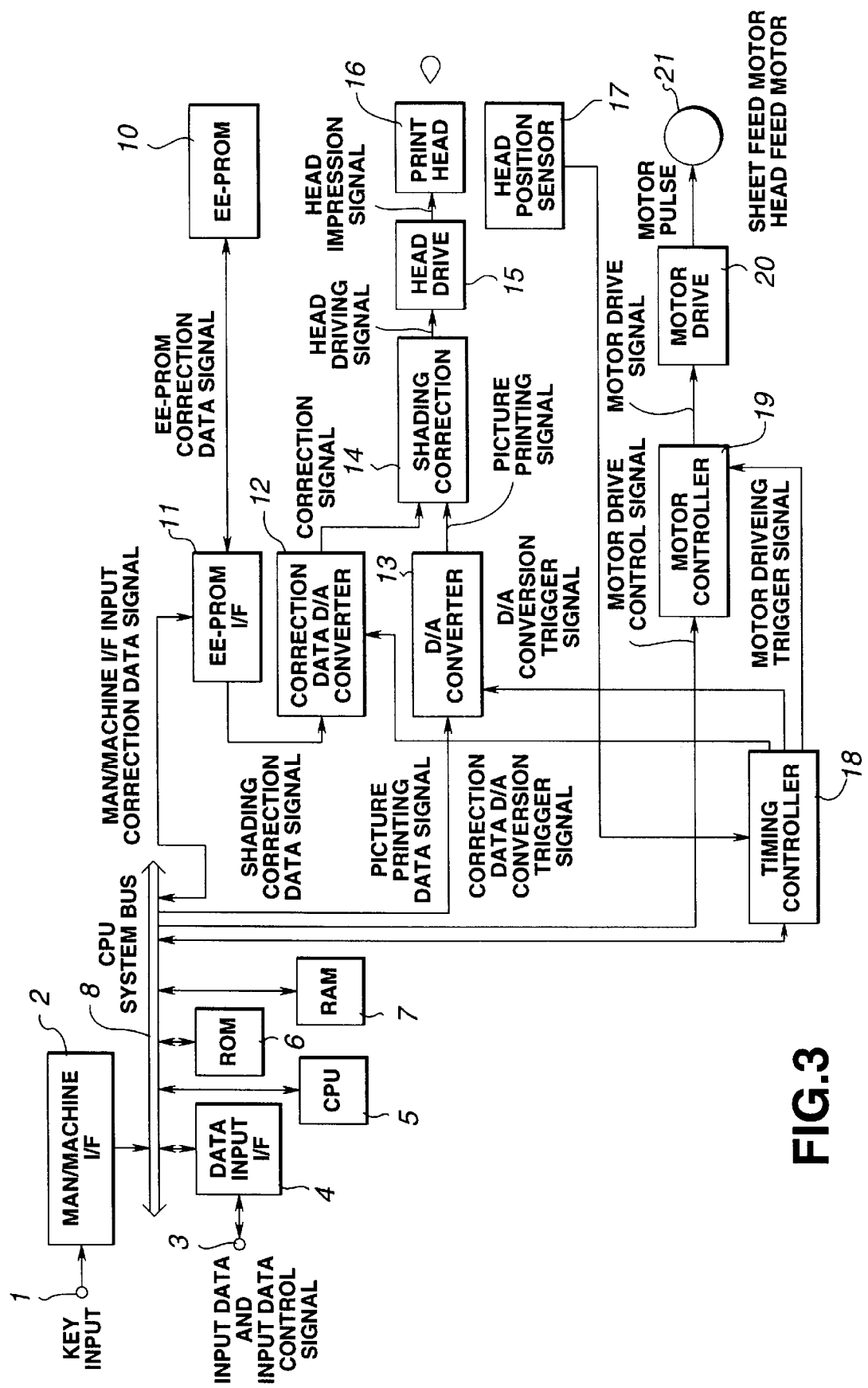
FIG. 3 is a schematic block circuit diagram showing an arrangement of a printer apparatus according to a first embodiment of the present invention.

The printer apparatus of the first embodiment includes an ink jet print head 16 employing an electrostrictive vibrator undergoing electrostriction, as shown in FIG. 3. The electrostriction is a phenomenon in which a dielectric substance becomes deformed or distorted on electrical field application. The printer head apparatus is configured so that a desired half-tone print will be obtained using, for example, a so-called ink dot diameter modulation method, and so that the shading correction for correcting fluctuations caused at the time of manufacture of individual nozzles of the print head 16 and those caused with lapse of time will be executed by an analog processor controlling the print head 16.

The ink dot diameter modulation method is a method consisting in changing the voltage level impressed across the electrostrictive vibrator of the print head responsive to data of an image to be printed for displacing the electrostrictive vibrator responsive to changes in the impressed voltage level for changing the volume of the ink liquid droplets discharged from the nozzle responsive to the displacement of the electrostrictive vibrator for obtaining the desired half-tone print.

Figure 4:
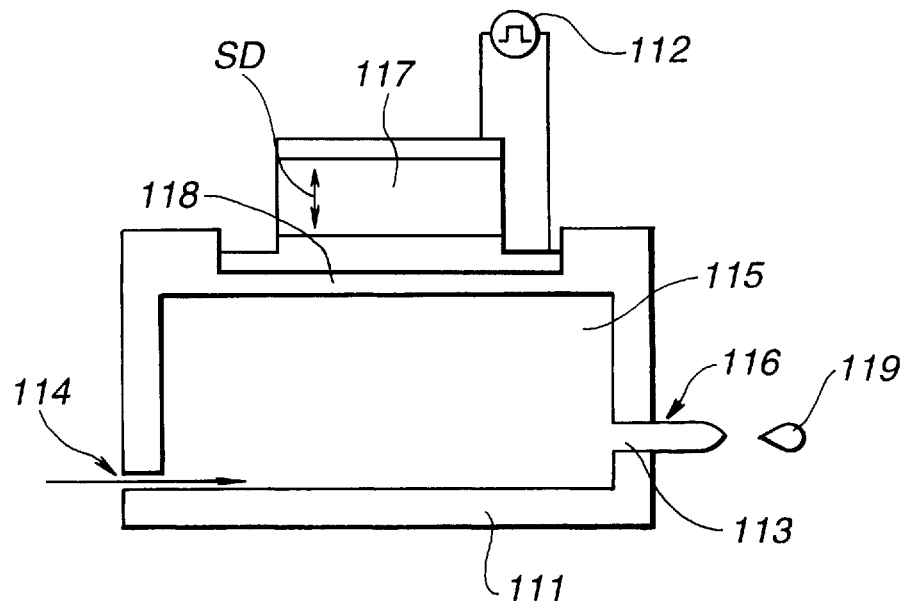
FIG. 4 illustrates a liquid droplet discharging principle of the print head.

The first embodiment of the printer apparatus uses a so-called vibration flat plate type as shown in a principle diagram of FIG. 4 as an illustrative example of the print head 16 employing a ink dot diameter modulation method quantitating the volume of the discharged ink liquid droplet.

The print head shown in the principle diagram of FIG. 4 includes a flat plate type electrostriction vibrator constituted by piezoelectric ceramics displaced in a direction indicated by SD responsive to the impressed voltage and a vibrating plate 118 affixed to the fat plate type electrostriction vibrator 117. The print head also includes a nozzle unit 111 having the electrostriction vibrator 117 and the vibration plate 118 and an ink chamber 115 defined by the interior of the nozzle unit 111. The print head also includes an ink supply port 114 fed with ink charged into the ink chamber 115, a nozzle 113 and an orifice 116 for discharging the ink as liquid ink droplets 119 and a voltage generator 112 for generating a voltage to be impressed across the electrostriction vibrator 117. The voltage corresponding to the data of the picture to be printed is generated by the voltage generator 112 and impressed across the electrostriction vibrator 117 for producing volumetric changes in the ink chamber 115 for discharging the ink liquid droplets.

Figure 5:
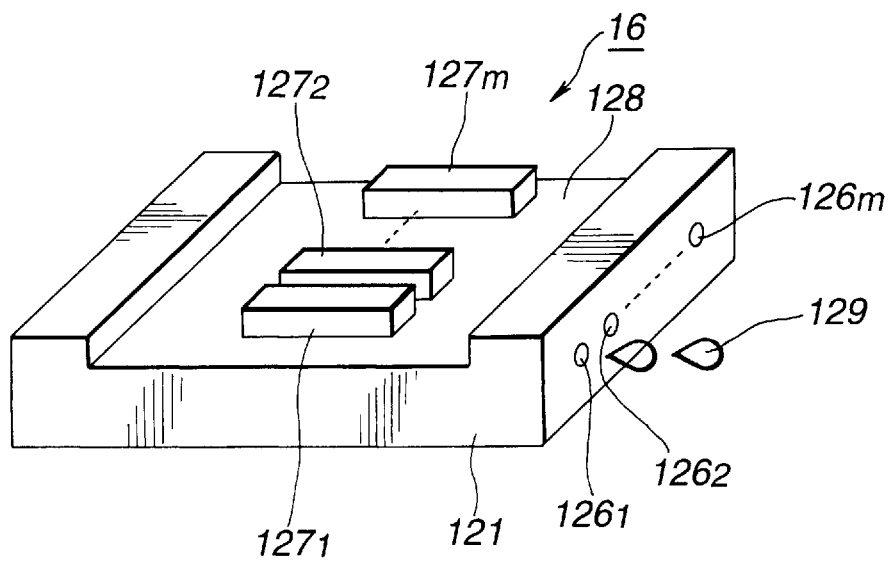
FIG. 5 is a perspective view showing a multi-nozzle print head.

The print head 16 of the present embodiment has multicolor nozzles configured as shown in the principle diagram of FIG. 4. That is, the print head 16 of the multi-head configuration has m electrostriction vibrators $127_1$ to $127_m$ in association with, for example, m nozzles, as shown in FIG. 5. By impression of an electrical voltage across each of the m nozzles $127_1$ to $127_m$, the ink liquid droplets 129 are discharged from the m orifices $126_1$ to $126_m$. The materials used for the electrostriction vibrators may be enumerated by piezoelectric ceramics, such as lead zirconate titanate ($PbTiO_3.PbZrO_3$) or barium titanate ($BaTiO_3$), quartz and Rochelle salts.

Meanwhile, in the above-described multi-head print head, it occurs frequently that the effective resolution becomes lower than the theoretically feasible resolution, as a result of manufacture tolerances of the respective nozzles, while the printing gradation level becomes inaccurate, such that printing with uniform printing quality cannot be achieved, as described previously. Moreover, similar problems arise due to deterioration of the nozzle in use with lapse of time.

Therefore, with the present embodiment, the characteristics of various nozzles are previously measured at the time of manufacture and the measured values of the nozzle characteristics are reflected in the voltage level impressed across the electrostrictive vibrator for correcting the fluctuations of the individual nozzles by way of shading correction.

That is, with the printing apparatus of the present invention, shown in FIG. 3, the relation among the impressed voltage levels applied across the electrostriction vibrators, size of dots formed on the recording sheet, density distribution in the dot and the dot shape is found as discharging characteristics of the print head 16 by a standard testing device, which is a device the design values of which can be pre-set. The discharging characteristics as found, that is measured values, or data derived from the measured values, are generated as shading correction data. The shading correction data at the time of manufacture are stored in the memory means connected to the printer head, such as PROM, EPROM, EEPROM, flash memory, dip switch or in the jumper switch. In the embodiment of FIG. 3, the EE-Prom 10 is used as the memory means. The EE-PROM 10 may be connected to the printer main body when the EE-PROM 10 is connected physically and electrically to the cartridge having a printer head. That is, a substrate of the EE-PROM present by itself may be connected to the printer main body when the EE-PROM is present as an EE-PROM substrate by itself and the user connects the printer head to the printer main body. Alternatively, the statement of the above measured values may be affixed to the print head which is put on sale so that a purchaser of the print head enters the annexed measured value when using the print head.

Moreover, with the present embodiment, it is possible to drive the individual nozzles for measuring the discharge characteristics of the individual nozzles for decreasing density fluctuations in picture printing caused by changes of the print head with lapse of time for reflecting the measured values in the voltage level applied across the electrostriction vibrator for achieving shading correction of the individual nozzles.

That is, in the first embodiment of the present invention, the user of the printer apparatus prints out s shading correction print sample periodically or before printing out the desired picture to observe the outputted results for specifying the one of the nozzles whose discharging state has been changed. The Based on the results, thus obtained, the shading correction data stored in the EE-PROM 10 is modified to an optimum value which is actually used. Specifically, the correction value found by the user on observing the shading correction print sample is entered by the user via a man/machine interface 2 and the shading correction data read out from the EE-PROM 10 is modified with the input correction value which is again stored in the EE-PROM 10. Alternatively, the correction value for modifying the shading correction data may be automatically measured when driving the individual nozzles and the shading correction data as found from the measured correction value may be stored in the memory means, such as the EE-PROM or the flash memory. For automatically measuring the correction values, the volume of the flying ink liquid droplets may be measured by a combination of an LED (light emitting diode) and a laser oscillator with a phototransistor or a photodiode. Alternatively, the size of the density of the ink dots affixed on the recording sheet may be measured in a similar manner for generating the correction value based on the measured results.

In outputting the shading correction picture print sample printed for removing fluctuations in characteristics of various nozzle characteristics, there is no reference nozzle operating as an absolute reference for calibration. Therefore, in data writing in the EE-PROM at the time of shipment of the printing head, the nozzle having the discharging characteristics presumed at the designing time becomes a nozzle for calibration and the discharging characteristic values of the individual nozzles are determined accordingly. If the user performs correction via the man-machine interfacing unit, it may be presumed that there lacks the head having the nozzle for calibration. At such time, the picture printing sample for shading correction is outputted by a head to be corrected for shading and a majority of nozzles of the head having the mean standard substantially uniform discharging characteristics may be deemed as the nozzles for correction. The nozzles having discharging characteristics deviated from the standard nozzle may be corrected for approaching to standard discharging characteristics for diminishing fluctuations from nozzle to nozzle for assuring uniform printing.

The shading correction employing the shading correction data as found during manufacture and that employing the shading correction data associated with deterioration with lapse of time may be applied not only to a multi-color print head each having a multi-nozzle, as shown in FIG. 5, but also to an ink jet print head having a sole monochromatic nozzle, an ink print jet head having a single multi-color nozzle or an ink jet print head having a single color multi-nozzle.

Figure 6:
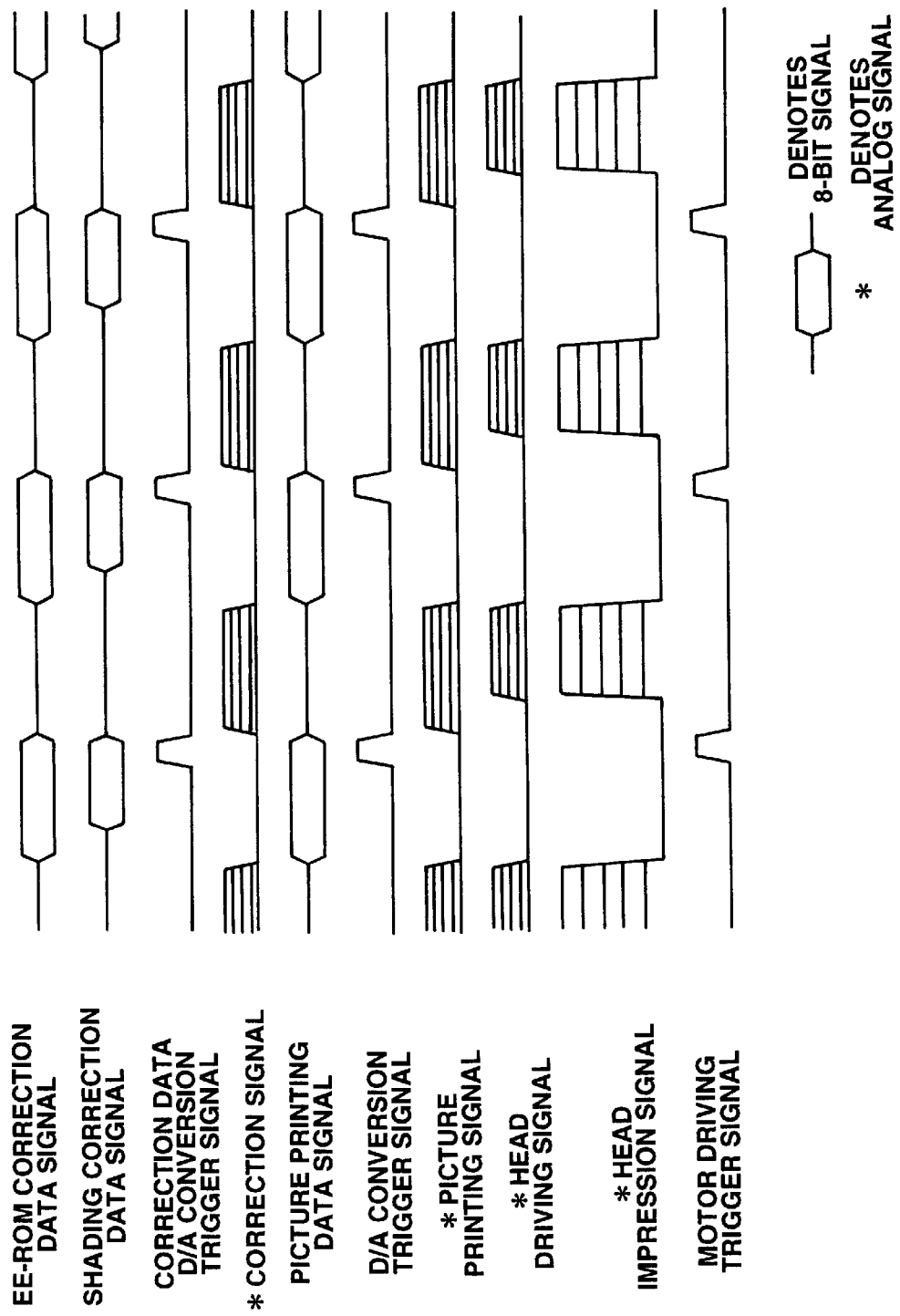
FIG. 6 is a timing chart for illustrating the operational timing of various components of the first embodiment of the printer apparatus.

The construction and the operation of the printer apparatus of the embodiment of FIG. 3 having the above-mentioned printer head are explained by referring to the timing chart for the respective points shown in FIG. 6.

If the user of the printer apparatus starts printing a desired picture, he or she enters a command meaning a print start command via a man/machine interfacing unit 2 or a data input interfacing unit 4. This print start command signal is sent via a CPU system bus 8 to a CPU or DSP 6 adapted for processing various signals and for controlling various components based on program data stored in the ROM 5. A key input by an operator is supplied as the print start request command signal to the man/machine interface 2 via a terminal 1. On the other hand, picture data for a picture to be printed, supplied from, for example, a host computer, is supplied as input data to the data input interfacing unit 4 via terminal 3. Moreover, the above-mentioned print start request command signal from the host computer is also supplied to the data input interfacing unit 4 as one of the input data control signals for bidirectional communication between the printer apparatus and the host computer.

If the print start request command is supplied such that the printer apparatus is ready for printing, the printer apparatus returns to the host computer a control signal specifying that the host computer is ready to accept the control signal via the data input interfacing unit 4. On accepting the control signal, the printer apparatus transmits the data of the picture to be printed to the printing apparatus. The printer apparatus sends the picture data, received via the terminal 3 and the data input interfacing unit 4, via the CPU system bus 8 to a RAM 7 for storage therein. At this time, the data input interfacing unit 4 controls the inputting of the picture data so as to prohibit overflow of the RAM 7. That is, the data input interfacing unit 4 outputs a control signal requesting cessation of the outputting of picture data to the host computer at a time point when the picture data has been stored in the totality of memory areas capable of storing the input data in the RAM 7.

When the picture data to be printed, thus stored in the RAM 7, has reached several lines, the CPU 5 starts the processing required for printing the picture data and substitutes picture printing data for printing the picture data for the picture data. Meanwhile, if the RAM 7 has a storage capacity corresponding to the entire picture to be printed, the processing required for picture printing may be carried out after storing all picture data. If the storage capacity of the RAM 7 is not up to the capacity corresponding to the entire picture, only picture data corresponding to the required number of lines is stored and the data input interfacing unit 4 performs control by the input data control signal requesting the cessation of the outputting of the picture data to the host computer. The picture printing data, substituting the picture data, is stored in a place different from a place where there is stored picture data on the same RAM 7 from which originated the above picture printing data. Alternatively, the picture printing data, substituting the picture data, can be stored by overwriting in the site on the same RAM 7 where the picture data from which originated the picture printing data has been stored.

When a number of the picture printing data substituting the picture data corresponding to the number driving the print head have been stored in the RAM 7, the CPU 5 causes the picture printing data stored in the RAM 7 to be read out and sent to a D/A converter 13 as a picture printing signal shown in FIG. 6. The number driving the print head at the time of storing the picture printing data in the RAM 7 corresponds to a scan of the print head in case of a so-called head driving type printer, such as a serial printer, in which printing is performed by driving a print head having tens of nozzles. In the case of the line head type printer having a print head having a number of nozzles equal to the size of the recording sheet, the above number corresponds to one line. The head driving type printer and the line head type printer will be explained subsequently.

The CPU 5 sends a motor driving signal to a motor controller 19 at the same time as it sends the picture printing data stored in the RAM 7 to the D/A converter 13. The motor controller 19 generates a motor driving signal based on the motor driving control signal and sends the motor driving signal to a motor driving unit 20. The motor driving unit 20 converts the motor driving signal into motor pulses having the voltage and the current capable of driving a motor unit 21 made up of a paper feed motor and a head feed motor and sends the motor pulse to the motor unit 21. In the case of the head driving printer, the head feed motor is actuated.

When the head feed motor is started, and a head position sensor 17 has sensed that the nozzle of the print head has reached the printing position on the recording sheet, a timing controller 18 outputs a D/A conversion trigger signal to the D/A converter 13, as shown in FIG. 6. The timing controller 18 simultaneously outputs a motor trigger signal to a motor controller 19, while outputting a correction data D/A conversion trigger signal to a correction data D/A converter 12, as shown in FIG. 6.

The correction data D/A converter 12 is fed with the above-mentioned shading correction data signals. That is, the data for shading correction, as found at the time of production of the printing head (EE-PROM correction data signals), modified into an optimum value by a correction value corresponding to the changes with lapse of time of the print head which the user enters via the man-machine interfacing unit 2, and again stored in the EE-PROM 10, are supplied to the EE-PROM interfacing unit 11, as shown in FIG. 6. From the EE-PROM interfacing unit, the EE-PROM correction data signals are supplied as data for shading correction to the correction data D/A converter 12. The correction data D/A converter 12 is responsive to a correction data D/A conversion trigger signal from the timing controller 18 to convert the shading correction data signal into a voltage level corresponding to a value indicated by the signal. The voltage level signal from the correction data D/A converter 12 is sent to the shading correction unit 14 as a correction signal shown in FIG. 6. A specified example of the shading correction data stored in the EE-PROM 10 will be described later.

The CPU 5 is also inspecting the state of the timing controller 18 and, when the D/A conversion trigger signal from the timing controller 18 is supplied to the D/A converter 13, the CPU 5 causes the picture printing data signal, so far stored in the RAM 7, to be sent to the D/A converter 13. The D/A converter 13 is responsive to the D/A conversion trigger signal to convert the picture printing data signal from the RAM 7 into a voltage level corresponding to the value indicated by the signal. The voltage-level signal from the D/A converter 13 is sent as a picture printing signal to a shading correction unit 14.

The shading correction unit 14 generates, from the voltage-level picture printing signal supplied from the D/A converter 13 responsive to the D/A conversion trigger signal and the voltage level correction signal supplied from the correction data D/A converter 12 responsive to the correction data D/A conversion trigger signal synchronized with the D/A conversion trigger signal, a voltage level head driving signal used for actual picture printing shown in FIG. 6, and sends the head driving signal to a head driving unit 15. That is, the shading correction unit 14 outputs a head driving signal which has been found from the shading correction data stored in the EE-PROM 10 and which may be used for correcting the ink-emitting characteristics of the individual nozzles of the print head actually employed. The shading correction unit 14 adds the picture printing signal and the correction signal together to form a head driving signal which is sent to the head driving unit 15.

The head driving signal is sent to the head driving unit 15 where it is amplified to a power required for displacing the electrostriction vibrator of a print head 16. The amplified signal is sent to the electrostrictive vibrator of the print head 16 as an impression signal shown in FIG. 6.

In the print head 16, the electrostrictive vibrator 117 shown in FIG. 4 is deflected in a direction indicated by arrow SD in FIG. 4, in accordance with the voltage level of the impression signal, for bending the vibrating plate 118. This decreases the volume in the ink chamber 115 and the ink charged therein is pressurized under the Padscal's principle. The ink in the ink chamber 115 is discharged via the nozzle 113 out of the orifice 116 to fly as the ink droplet 119 onto the recording sheet. The ink liquid droplet 119 forms an ink dot having a certain dot size on the recording sheet. The ink dot assumes a size corresponding to the voltage level applied across the electrostrictive vibrator 117.

The motor controller 19 is responsive to the motor driving control signal from the CPU 5 to generate a motor driving signal for feeding a recording sheet as appropriate in synchronism with the driving of the print head 16. This motor driving signal is supplied via the motor driving unit 20 to a paper feed motor of the motor unit 21 for feeding the recording sheet.

The paper feed, head feed and the voltage impression across the head are carried out by the repetition of the above sequence of operations.

If the print head 16 is formed as a multiple head composed of plural heads, such that there are a large number of nozzles, it is possible to load an IC (integrated circuit) on the head itself to decrease the number of the interconnections to the print head. The CPU 5 taking charge of processing of picture data also performs γ correction or color correction in case of color printing.

Figure 7:
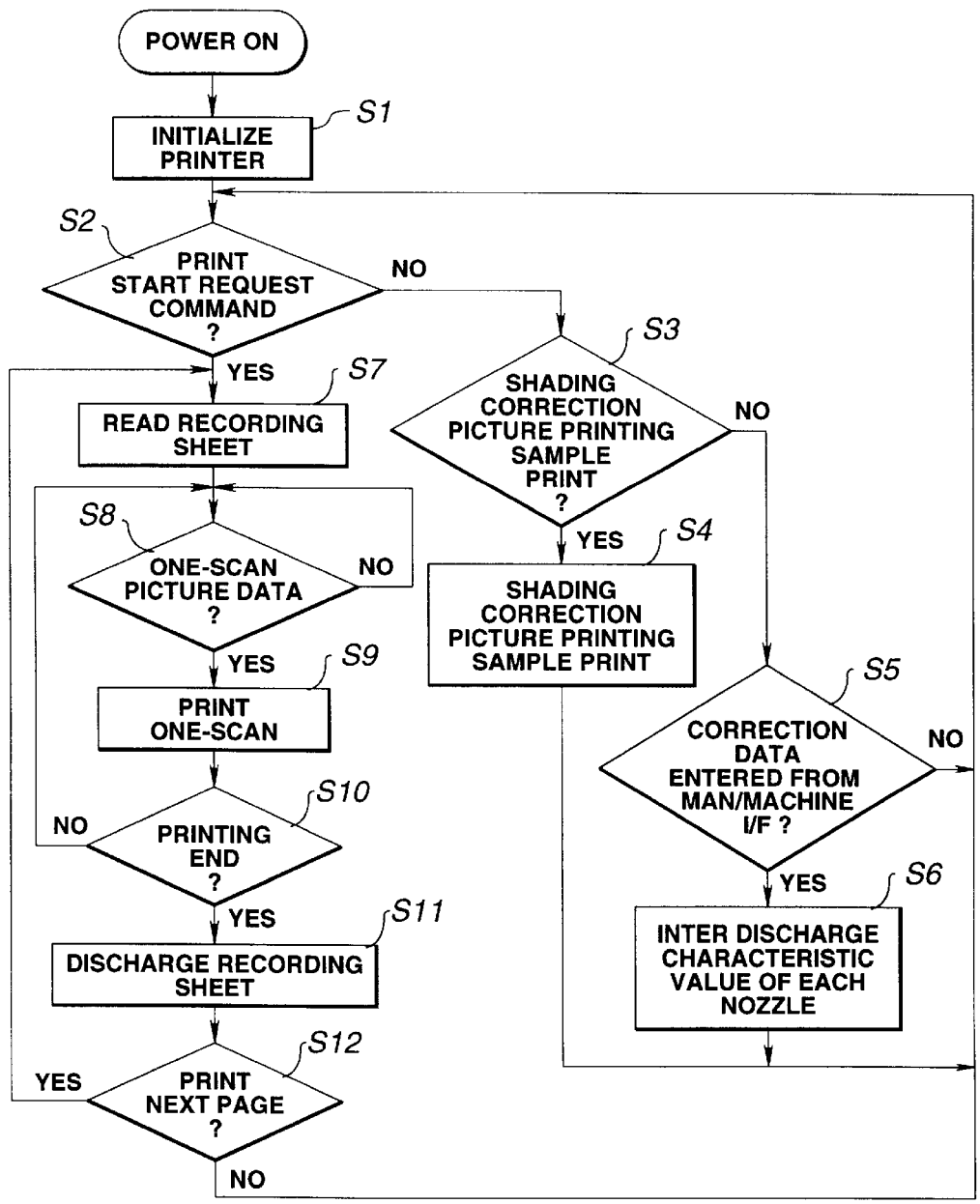
FIG. 7 is a flowchart showing the operation of the first embodiment of the printer apparatus.

The printing operation in the printer apparatus shown in FIG. 3 occurs as shown in a flowchart of FIG. 7.

In FIG. 7, if the power source of the printer apparatus is turned on, the printer apparatus is initialized at step S1. At the next step S2, it is judged whether or not a print start request command signal has been supplied. If no printing start request command signal has been supplied at the step S2, processing transfers to step S3.

At this step S3, it is judged whether or not the picture printing sample for shading correction for coping with changes in the nozzle discharge characteristics caused by the above changes with lapse of time is to be printed. If the result of judgment at this step S3 is YES, the picture printing sample for correction is printed at step S4. Processing then reverts to step S2. If the result of judgment at this step S3 is NO, it is judged at step S5 whether or not there is any input of the correction data signal from the man/machine interfacing unit 2. If the result of judgment at this step S5 is NO, processing reverts to step S2 and, if otherwise, to step S6. At this step S6, the ink-emitting properties of the respective nozzles are entered as correction signals for the shading correction data from the man/machine interfacing unit 2.

If the result of judgment at this step S3 is YES, that is if it is judged that the printing start request command signal has been entered, processing transfers to steps S7 ff. At step S7, paper feed occurs for feeding the recording paper sheet to a preset printing start position. At step S8, it is judged whether or not one-scan picture data has been stored in the RAM 7. If it has been judged that one-scan picture data have not been stored, the processing of step S8 is repeated. If the one-scan picture data has been judged to have been stored, processing transfers to step S9 where printing picture data is generated from the one-scan picture data and used for performing one-scan printing. Processing then transfers to step S10 where it is judged whether or not printing has come to a close. If the result of judgment at step S10 is NO, processing reverts to step S8 and, if otherwise, processing transfers to step S11, where the recording sheet is discharged. At the next step S12, it is judged whether or not the next page is to be printed. If the next page is judged to be in need of printing at step S12, processing reverts to step S7 and, if otherwise, processing reverts to step S2.

Next, illustrative examples of the shading correction data stored in the EE-PROM 10 and the correction values of the shading correction data entered from the man-machine interfacing unit 2 are explained.

First, an illustrative example of the shading correction data stored in the EE-PROM 10 (EE-PROM correction data) is explained.

The EE-PROM 10 stores data made up of head sorts, head numbers, nozzle numbers and values of nozzle properties. In the case of a multi-nozzle print head, plural nozzle numbers and the associated values of the nozzle properties are associated with the same head sort and the same head number. That is, as the head sorts, data specifying head sorts associated with colors, such as cyan, magenta and yellow, are stored. Similarly, as the head sort, data specifying lot numbers, are stored, whereas, as the nozzle numbers, data of the nozzle numbers specifying the numbers of the plural nozzles are stored. Finally, as the values of the nozzle properties, data of the discharging properties for correction for the respective nozzles associated with the respective nozzle numbers are stored.

As illustrating the values of the discharging properties for correction, in the case of a nozzle having the relation between the impressed voltage and the ink dot diameter equal to the design relation, that is a nozzle not in need of correction, a value of, for example, ±0, is set, whereas, in the case of a nozzle for which a voltage has to be impressed which will increase the ink dot diameter by 10% as compared to the design diameter on the occasion of the maximum value input, a value of +10 is set. Similarly, in case of a nozzle for which a voltage has to be impressed which will decrease the ink dot diameter by 10% as compared to the design diameter on the occasion of the maximum value input, a value of −10 is set, whereas, in the case of a nozzle for which a voltage has to be impressed which will increase the ink dot diameter by 50% as compared to the design diameter on the occasion of the maximum value input, a value of +50 is set. That is, in case ink liquid droplets are discharged from a nozzle of the multi-nozzle print head nozzle, if the values of the ink-emitting properties for correction stored in the EE-PROM 10 in association with the nozzle has the value of +10 indicating that a voltage has to be impressed which will increase the ink dot diameter by 10% as compared to the design value on the occasion of the maximum value input, such nozzle has discharging properties lower than the design value such that the volume of the emitted ink liquid droplets is decreased. Consequently, during actual ink discharging from such nozzle, the impressed voltage is increased for matching to the value of the characteristic properties for increasing the volume of the ink liquid droplets for achieving the ink dot diameter intended at the designing time.

An illustrative example of the correction value of the shading correction data entered from the man/machine interfacing unit 2 (man/machine interfacing input correction data signal) is explained.

For determining a correction value of the shading correction data entered from the man-machine interfacing unit 2, the picture printing sample for shading correction as shown in FIG. 8 is tentatively printed. In the case of a print head having, for example, m nozzles, lines indicated by L1 to Lm in FIG. 8 are printed on a recording sheet in association with the respective m nozzles. The user observes the lines L1 to Lm printed on the recording sheet in association with the respective nozzles. More specifically, the user observes how a line printed by discharging the ink from a given nozzle is higher or lower in density than the lines printed by ink discharging from a majority of standard nozzles. The user thus visually judges the discharging properties of the nozzles and issues a command for increasing or decreasing the volume of the ink liquid droplets discharged from the nozzle by key input via the man/machine interfacing unit 2.

For example, if the printer apparatus has liquid crystal display means, a key K− or a key+ provided on the printer apparatus is actuated for issuing a command for modifying the values of the nozzle properties liquid display means during the time when a display specifying the head sort <head> and the head number <nozzle> as well as the values of the nozzle properties <characteristics> are made on the liquid crystal display means as shown in FIG. 9. If the key K− is pressed once, the characteristic value becomes −1, whereas, if the key K+ is pressed once, the characteristic value becomes +1. FIG. 9 shows an instance in which the characteristic value of the No. 5 nozzle is set to +5 in case the head sort and the head number indicate a cyan head as indicated by head>cyan, and the nozzle number indicates the No. 5, as indicated by <nozzle> No. 5. Explaining with reference to the above example of the discharging characteristic value for correction, such voltage is impressed for the No. 5 nozzle which increases the ink dot diameter on a maximum value input by 5% as compared to the design value.

In determining the correction value for shading correction entered from the man/machine interfacing unit 2, the above-mentioned operation is performed for each nozzle in need of correction. If the user then feels desirous to comprehend the effect of correction, the picture printing sample for shading correction is again printed tentatively.

The shading correction data stored in the EE-PROM 10 according to the setting described above and the correction value for shading correction as entered from the man/machine interfacing unit 2 are handled in the following manner. That is, the correction values for the shading correction data entered from the man/machine interfacing unit 2, that is new characteristic values of the respective nozzles, may be immediately stored in the EE-PROM 10 at the time point of entry of the data as explained previously. Alternatively, correction data required for printout is first found from both the correction data inherently stored in the EE-PROM 10 and new correction values entered from the man/machine interfacing unit 2 before storage in the EE-Prom unit 10, instead of immediately storing the correction data in the EE-PROM 10. In this case, it is possible for the user to perform an operation of storing the correction value newly entered by the user from the man/machine interfacing unit 2 when storing the correction value in the EE-PROM 10. The correction data required for the printing may be found by an equation of (value of the correction data of the EE-PROM 10)+(number of times of pressing the key K+)−(number of times of pressing the key K−).

The relation between the values of the shading correction data from the EE-PROM 10, the values of the shading correction data ultimately obtained from the shading correction data supplied from the man/machine interfacing unit 2 and the design values of the ink-emitting characteristics will be explained by referring to FIG. 10, in which a solid line indicates a design ink-emitting characteristic curve and a broken line indicates an ink-emitting characteristic curve for a nozzle having a poor discharge characteristics in need of correction, for example, an ink discharge characteristic curve for a nozzle for which the above value of +10 is optimum as the ink discharge characteristic value for correction. If the ink discharge characteristic value for correction of a nozzle is +10, it indicates that the optimum discharging can be achieved by applying a voltage which will increase the ink dot diameter by 10% as compared to the design value at the time of maximum input which corresponds to a level 255 if the input level is represented by 0 to 255.

Figure 10:
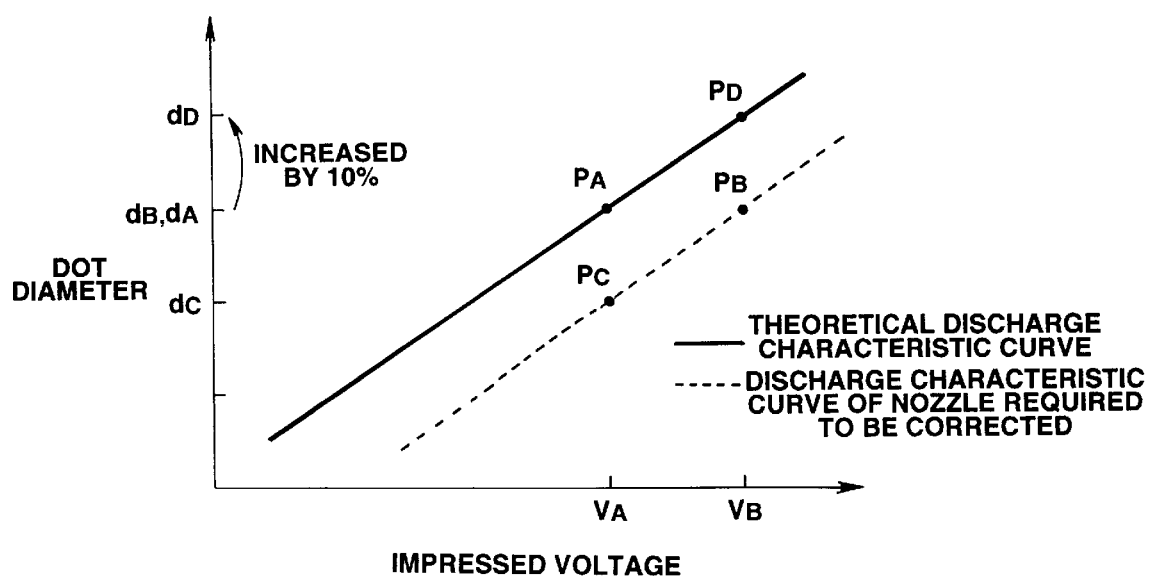
FIG. 10 is a graph for illustrating the relation between the dot diameter and the impressed voltage at the time of shading correction in the first embodiment of the printer apparatus.

Specifically, a point PA, for example, on the design emitting characteristic curve as indicated by a solid line in FIG. 10, specifies that the impressed voltage which will give a design dot diameter dA for the maximum input level (255) is VA. On the other hand, a point PC on the ink emitting characteristic curve shown by a broken line in FIG. 10 indicates that the diameter of the dot formed on the recording sheet by the ink discharged from the nozzle (nozzle which gives optimum ink discharging by the characteristic value for discharge correction of +10 by shading correction) becomes equal to dC if the impressed voltage for the maximum input level of 255 as in the case of the point PA in the characteristic curve is VA for the maximum input level as in the case of the point PA on the design curve. Consequently, for obtaining the same dot diameter dA as that of the point PA on the design characteristic curve with the nozzle in need of shading correction, it is necessary to apply a voltage VB which will give the dot diameter dD larger by 10% than the dot diameter dA of the point PA on the design characteristic curve, that is a point PB on the discharge characteristic curve indicated by a broken line in FIG. 10.

The same holds for the input level less than the maximum value (<255). Using an ink discharging characteristic curve of a nozzle found by a previous experiment to be in need of shading correction, a broken-line curve in FIG. 10, and the design ink-discharging characteristic curve, a design impressed voltage is first found from the input level (0 to 255), and subsequently the design impressed voltage is corrected based on the difference between the actual discharge characteristic curves of the respective nozzles and the design characteristic curve to find the voltage actually applied across the electrostrictive vibrator associated with each nozzle.

As for the relation between the ink dot diameter and the picture printing density, the optical density OD of a print sample printed by the nozzle having the design discharging properties is measured by a previous experiment, and the relation between the picture printing density and the input level (0 to 255) in an ideal nozzle conforming to the curve is found.

FIG. 11 shows the relation the input level, optical density D, ink area ratio A, dot diameter (ratio) 2r where $r=(A/\pi)^{1/2}$, and the actual dot diameter at 300 dpi, with the dot interval of approximately 80 $\mu$m. If RB represents ink reflectance and RW the reflectance of the paper sheet, the optical density D is given by the equation (1):

$$D = -\log(RB \cdot A + RW(1-A)) \tag{1}$$

For the optical density of the ink ODB=2.0, it is necessary that the ink reflectance RB=0.01. For the ink ODB=1.5, it is necessary that the ink reflectance RB=0.0316. Similarly, for the optical density of the ink ODW=0.1, it is necessary that the paper sheet reflectance RW=0.794. If RB=0.0316 and RW=0.794, the area ratio of the ink A may be found from the above equation (1) by the equation (2):

$$A=(1/0.7624)(-10D+0.794) \qquad (2)$$

It is seen from the table shown in FIG. 11 that, for printing with 300 dpi, the maximum dot diameter equal to 1.3 to 1.6 times the minimum dot diameter suffices. If the minimum dot diameter is e.g., 60 μm, the maximum dot diameter id 78 to 96 μm.

Figure 12:
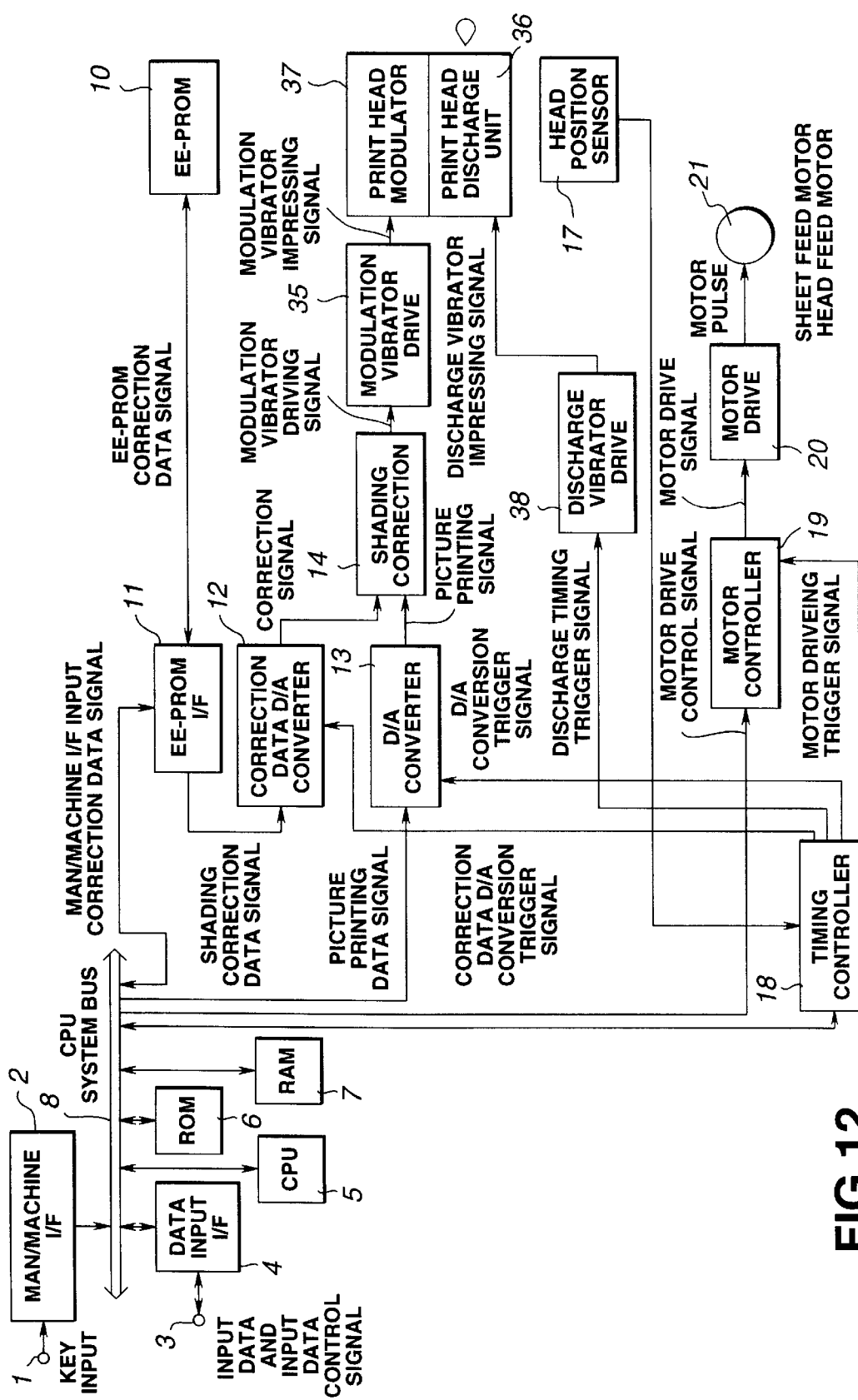
FIG. 12 is a schematic block circuit diagram showing a printer apparatus of a second embodiment of the present invention.

FIG. 12 shows a printer apparatus according to the second embodiment of the present invention having a print head for obtaining a desired half-one print by using a so-called multi-density ink mixing type ink dot density modulating method quantitating the density of the discharged liquid ink droplet (intra-ink-dot density modulation method) and in which shading correction for correcting the fluctuations produced at the time of production of the individual nozzles of the print head and those caused with lapse of time. The parts or components similar to those shown in FIG. 3 are denoted by the same reference marks and the corresponding description is omitted for simplicity.

The multi-density ink mixing type ink dot density modulating method is such a method in which the voltage level of the voltage applied across the electrostriction vibrator of the print head is varied responsive to data of the picture to be printed and the electrostrictive vibrator is displaced responsive to changes in the impressed voltage level so that the volume of the ink solution o be mixed is varied responsive to the displacement of the electrostrictive vibrator for obtaining the desired half-tone print. For mixing the ink solution in the multi-density ink mixing type ink dot density modulating method, pre-set amounts of an ink with a higher density and an ink of a lower density or a transparent solvent are mixed in an ink head before discharging the ink liquid droplets from the nozzle and the resulting mixture is discharged from the ink head. Alternatively, an ink with a higher density and an ink of a lower density or a transparent solvent are separately quantitated and mixed in the ink head responsive to displacement of the electrostrictive element before being emitted as the ink droplets via the nozzle. The inks are mixed during flight or on arrival at the recording sheet for forming a sole ink dot. The materials of the electrostrictive vibrator may be enumerated by piezoelectric ceramics, composed of lead titanate zirconate ($PbTiO_3.PbZrO_3$) or barium titanate ($BaTiO_3$), quartz or Rochelle salts.

Figure 13:
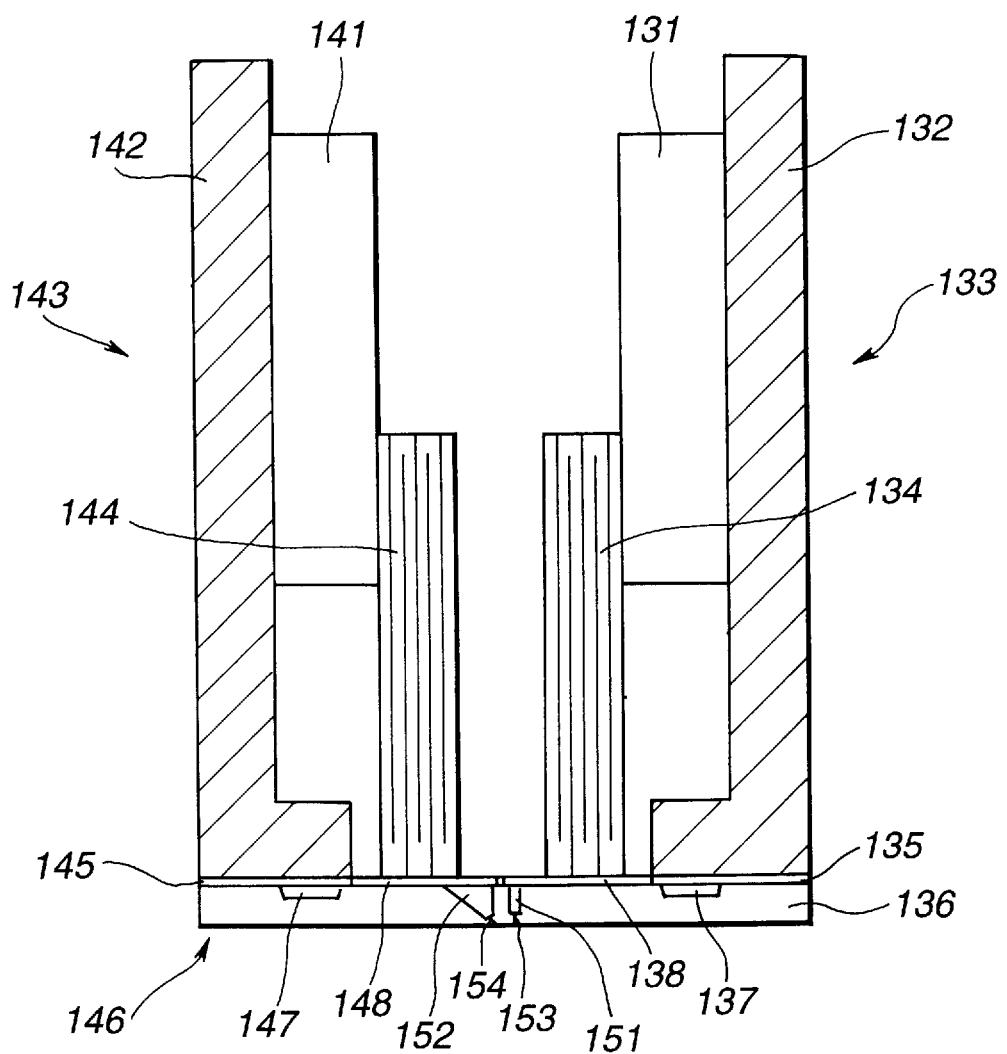
FIG. 13 is a cross-sectional view of a print head of a two-solution mixing type, that is an ink solution and a diluting solution mixing type.
Figure 14:
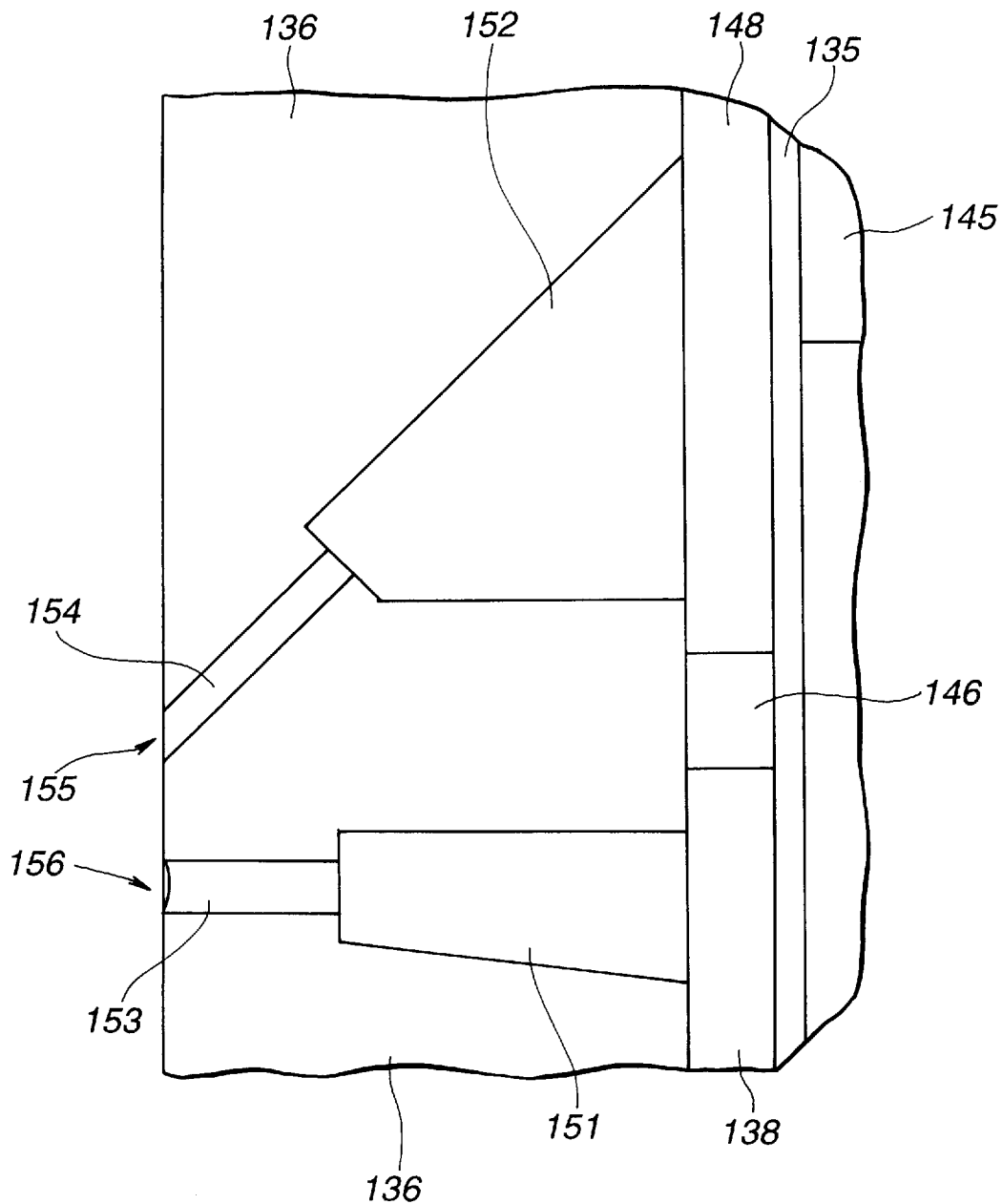
FIG. 14 is an enlarged view showing the vicinity of a nozzle of the print head shown in FIG. 11.

As an illustrative example of a print head employing the multi-density ink mixing type ink dot density modulating method, a printer apparatus shown in FIG. 12 employs a two-solution mixing type print head (carrier jet type print head) adapted for using a mixture of the ink solution and a dilution solution (carrier), as shown in FIGS. 13 and 14. The print head shown in FIGS. 13 and 14 employs a piezo element as an electrostrictive vibrator and is adapted for quantitating the ink and discharging the dilution solution (carrier). FIGS. 13 and 14 show the print head in a cross-section and the vicinity of the nozzle in an enlarged view, respectively.

The print head shown in FIGS. 13 and 14 are made up of a cavity unit 146 defining a discharge side cavity 138 and a quantitation side cavity 148, a discharge side piezo unit 133 and a quantitation side piezo nit 143 associated respectively with the discharge side cavity 138 and the quantitation side cavity 148. The cavity unit 146 is made up of an orifice plate 136, having a quantitation side nozzle 154 and a discharge side nozzle 153, a cavity side wall 145 and a vibration plate 135. The discharge side piezo unit 133 is made up of a discharging side laminated piezo element 134, a support 131 for securing one end of the piezo element 134, and a discharging side holder 134 for securing the piezo element 134 and the support 131 to the cavity unit 146. Similarly, the quantitation side piezo unit 143 is made up of a quantitation side laminated piezo element 144, a support 131 for securing one end of the piezo element 144, and a quantitation side holder 142 for securing the piezo element 144 and the support 141 to the cavity unit 146. The piezo elements 134, 144 are each made up of a piezoelectric material and an electrically conductive material layered together alternatively. The opening direction of the quantitation side nozzle 154 is about 45. relative to the opening direction of the discharging side nozzle 153. In the print head shown in FIGS. 13 and 14, the orifice plate 136 is formed by injection molding of resin such as polysulfone, while a cavity sidewall section 145 is formed of a photosensitive resin, such as dry film photoresist and the vibration plate 135 is formed by a metal plate, such as a nickel plate. The nozzles 153, 154 are machined by, for example, an excimer laser.

For driving the print head shown in FIGS. 13 and 14, a signal voltage is applied across the discharging side layered piezo element 134 and the quantitation side layered piezo element 144 at timings shown in FIGS. 15A and 15B, wherein the abscissa and the ordinate the time and the voltage, respectively. In the present embodiment, the ink discharging period is 1 msec, with the frequency being 1 kHz. During this discharging period, the ink liquid droplets are discharged.

Figure 15:
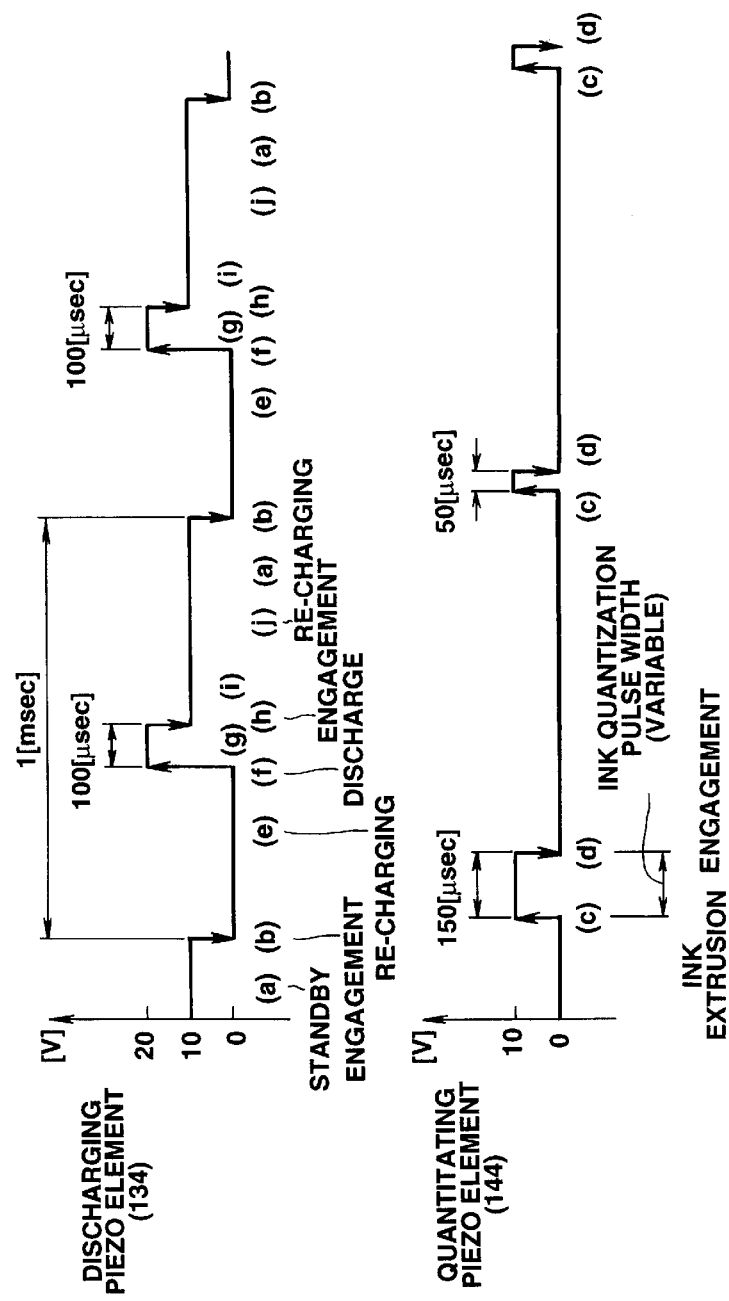
FIGS. 15A and 15B are timing charts for illustrating the operation of the two-solution mixing type print head.

Referring to FIGS. 13 to 15, the dilution solution is supplied from a dilution solution tank, not shown, and introduced from the supply pipe via the supply duct and a dilution solution supply chamber 137 through the discharge side cavity 138 into a dilution solution inlet 151. The dilution solution is supplied via the dilution solution inlet 151 into a discharge side nozzle 153. On the other hand, the ink is supplied from the ink tank, not shown, and transferred via a supply duct, supply groove and an ink supply chamber 147 into an ink inlet 152 through a quantitation side cavity 148 and thence into an ink quantitation nozzle 154. During the standby time prior to discharging shown in FIG. 15A, an electrical voltage of 10 V, for example, is impressed across the discharging side layered piezo element 134.

During ink discharging, the impressed electrical voltage across the discharge side layered piezo element 134 is set to, for example, 0 V, at a timing of FIG. 15A at b. This contracts the size of the discharging side layered piezo element 134, while the discharging side cavity 138 is expanded in volume, thus setting a negative internal pressure for drawing the dilution solution int the discharging side nozzle 153. Simultaneously, or after a short delay, at a timing c of FIG. 15B, a driving voltage of, for example, 10 V, is applied as a driving voltage across the quantitation side layered piezo element 144. This elongates the layered piezo element 144 in a longitudinal direction so that an internal pressure is applied from the quantitation side nozzle 154 via the quantitation side orifice 155 and hence the ink is exuded from the quantitation side nozzle 154 via the quantitation orifice 155 to outside for quantitation. The ink is exuded from the quantitation nozzle 155 to near the dilution solution side discharging orifice 156 for quantitation. If, in this state, a driving signal of, for example, 20 V, is applied as a driving signal to the discharging side layered piezo element 134, an internal pressure is applied via the vibration plate 135 from the discharging side cavity 138 to the discharging side nozzle 153. Under this internal pressure, the dilution solution is exuded via the discharging orifice 156 and unified with the ink previously quantitated and exuded near the discharging orifice 156 so as to be discharged as an ink liquid droplet of a pre-set density.

If subsequently the voltage across the piezo element 134 is lowered to, for example, 10 V at a timing h in FIG. 15A, the piezo element 134 is contracted in size such that the internal pressure in the nozzle 153 becomes negative and hence the dilution solution is introduced in the nozzle 153. As for the piezo element 144, the driving voltage is lowered to, for example, 0 V at a timing d in FIG. 15B, so that the ink remaining on the orifice plate is introduced into the nozzle 154. During the following period shown at i of FIG. 15A, the internal pressure from the cavity 138 to the nozzle 138 is restored to its original value, so that the dilution solution is again charged into the nozzle 153 under a capillary tension as shown at j in FIG. 15A.

With a print head 12 according to a second embodiment shown in FIG. 12, an arrangement shown in FIGS. 13 and 14 is applied to a multi-color multi-nozzle arrangement. In the arrangement shown in FIG. 12, the print head is made up of a print head modulation unit 37 and a print head discharging unit 36 corresponding to an ink quantitation portion and to a dilution solution discharging portion, respectively.

In the present second embodiment, the effective resolution becomes lower than the design value due to manufacture tolerances of the individual nozzles of the multi-nozzle print head. In the present embodiment, the dilution solution discharging nozzles and the ink quantitation nozzles are collectively termed the nozzles. In addition, the picture printing gradation level becomes inaccurate such that picture printing with uniform picture quality cannot be achieved. Similar problems arise due to deterioration of the individual nozzles with lapse of time.

Thus, in the present second embodiment, the characteristics of the individual nozzles are previously measured at the time of manufacture and the measured values thus obtained are reflected in the voltage level applied across the electrostrictive vibrator for correcting fluctuations in the individual nozzles for reducing printing density fluctuations caused by manufacture tolerances of the individual nozzles by way of correcting the nozzle shading.

Specifically, with the present second embodiment of the printer apparatus, the relation between the impressed voltage level across the piezo element as the electrostrictive element and the distribution of the density in the dots formed on the recording sheet is found for each nozzle of the print head at the time of manufacture of the print head as modulation characteristics of the print head by a standard testing device, that is a device the design value of which can be set, and the modulation characteristics thus found are converted into numerical measured values. These measured values per se or data found from these measured values are generated as shading correction data. The shading correction data at the time of manufacture of the print head are stored in memory means similar to that used in the first embodiment and which is annexed to the print head. The EE-PROM 10 may be physically and electrically connected to a cartridge provided with the print head, while it may also be present by itself as an EE-PROM substrate and connected to the main body of the printer when the user connects the print head thereto.

Alternatively, the measured values may be attached to the print head at the time of sale thereof so that the user purchasing the print head can enter the annexed set of the measured values when using the print head.

In the present second embodiment, the individual nozzles are transiently driven as in the first embodiment for reducing picture printing density fluctuations ascribable to deterioration of the print head with lapse of time for measuring the modulation characteristics of the individual nozzles. The measured values are reflected in the voltage level impressed across the electrostrictive vibrator for correcting the shading of the respective nozzles.

That is, in the second embodiment of the present invention, the user of the printer apparatus prints out s shading correction print sample periodically or before printing out the desired picture to observe the outputted results for specifying the nozzle whose modulated state has been changed. Then, based on the results, thus obtained, the shading correction data stored in the EE-PROM 10 is modified to an optimum value which is actually used. Specifically, the correction value found by the user on observing the shading correction print sample is entered by the user via a man/machine interface 2 and the shading correction data read out from the EE-PROM 10 is modified with the input correction value which is again stored in the EE-PROM 10. The arrangement and the operation of the printer apparatus of the second embodiment shown in FIG. 12 is explained. The arrangement of FIG. 12 is directed to that in which shading correction is performed in an analog processor controlling the print head. The parts or components similar to those shown in FIG. 3 are not explained and only different portions are explained.

That is, in the arrangement of FIG. 12, the correction data D/A converter 12 is fed with signals of the shading correction data. Specifically, the shading correction data for correcting the modulation characteristics of the individual nozzles housed within the EE-PROM 10, that is the EE-PROM correction data signals, are supplied to the EE-PROM interfacing unit 11 where the EE-PROM correction data signals are converted into shading correction data which are supplied to the correction data D/A converter 12. Thus the correction data D/A converter 12 is responsive to a correction data D/A conversion trigger signal from the timing controller 18 to convert the shading correction data signals into voltage values indicated by the signals. The voltage signals from the correction data D/A converter 12 are sent to the shading correction unit 14 as correction signals for correcting the modulation characteristics of the individual nozzles of the print head.

The shading correction unit 14 is fed with a voltage level signal, as a picture printing signal, obtained by converting the picture printing data signals from the RAM 7 by the D/A converter 13 responsive to the D/A conversion trigger signal.

The shading correction unit 14 generates, from the voltage-level picture printing signal supplied from the D/A converter 12 responsive to the D/A conversion trigger signal and the voltage level correction signal supplied from the correction data D/A converter 12 responsive to the correction data D/A conversion trigger signal synchronized with the D/A conversion trigger signal, a voltage level modulation vibrator driving signal used for actual picture printing, and sends the modulation vibrator driving signal to a modulation vibrator driving unit 35. That is, the shading correction unit 14 outputs a modulation vibrator driving signal which has been found from the shading correction data stored in the EE-PROM 10 and which may be used for correcting the modulation characteristics of the individual nozzles of the print head actually employed. The shading correction unit 14 adds the picture printing signal and the correction signal together to form a modulation vibrator driving signal.

The modulation vibrator driving signal is sent to the modulation vibrator driving unit 35 where it is amplified to a power required for displacing the electrostrictive vibrator for modulation, that is the layered piezo element for ink quantitation 144. The resulting power is supplied as a modulation vibrator impression signal to the print head modulation unit 37. The modulation vibrator impression signal is applied for a pre-set time interval to the print head modulation unit 37 and subsequently rendered invalid. This quantitates the ink in the print head modulation unit 37.

When the ink quantitation comes to a close, the timing controller 8 outputs to the discharge vibrator driving unit 38 a discharge timing signal corresponding to the picture printing data signal. This discharge timing signal is amplified by the discharge vibrator driving unit 38 to a power required for displacing the electrostrictive vibrator for discharging, that is the layered piezo element 134 for discharging the dilution solution. The resulting power is sent as the discharge vibrator impression signal to the print head discharging unit 36 which then unifies the dilution solution with the ink quantitated by the print head modulation unit 37 and discharges the resulting solution via the discharge orifice 156. This forms an ink dot of a desired density on the recording sheet.

When the first ink dot formation has been done on the recording sheet, the next ink dot is formed. To this end, the picture printing data substituted on the RAM 7 for picture printing is sent to the D/A converter 13. From this time on, the operation similar to that described previously is performed.

Subsequently, the motor controller 19 forms a motor driving signal for feeding the recording sheet as appropriate n synchronism with the driving of the print head, based on the motor driving control signal from the CPU 5, as in the arrangement shown in FIG. 3. This motor driving signal is sent via the motor driving unit 20 to a paper feed unit 21 via the motor driving unit 20 for feeding the recording paper sheet. By repetition of the sequence of operations, paper feed, head feed, voltage impression across the head and ink discharging are performed.

Figure 16:
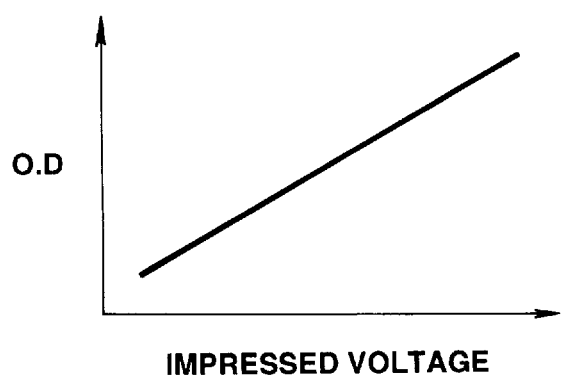
FIG. 16 is a graph showing the optical density and the impressed voltage in the print head employing the multi-density ink mixing type ink dot density modulation method.

FIG. 16 shows the relation between the impressed voltage and the optical density in the printing head employing the multi-density ink mixing type ink dot density modulating method as in the present second embodiment.

Although the displacement of the layered piezo element for ink quantitation 144 ia corrected in the embodiment of FIG. 12, it is possible to correct the displacement of the layered piezo element for discharging 134 simultaneously.

Figure 17:
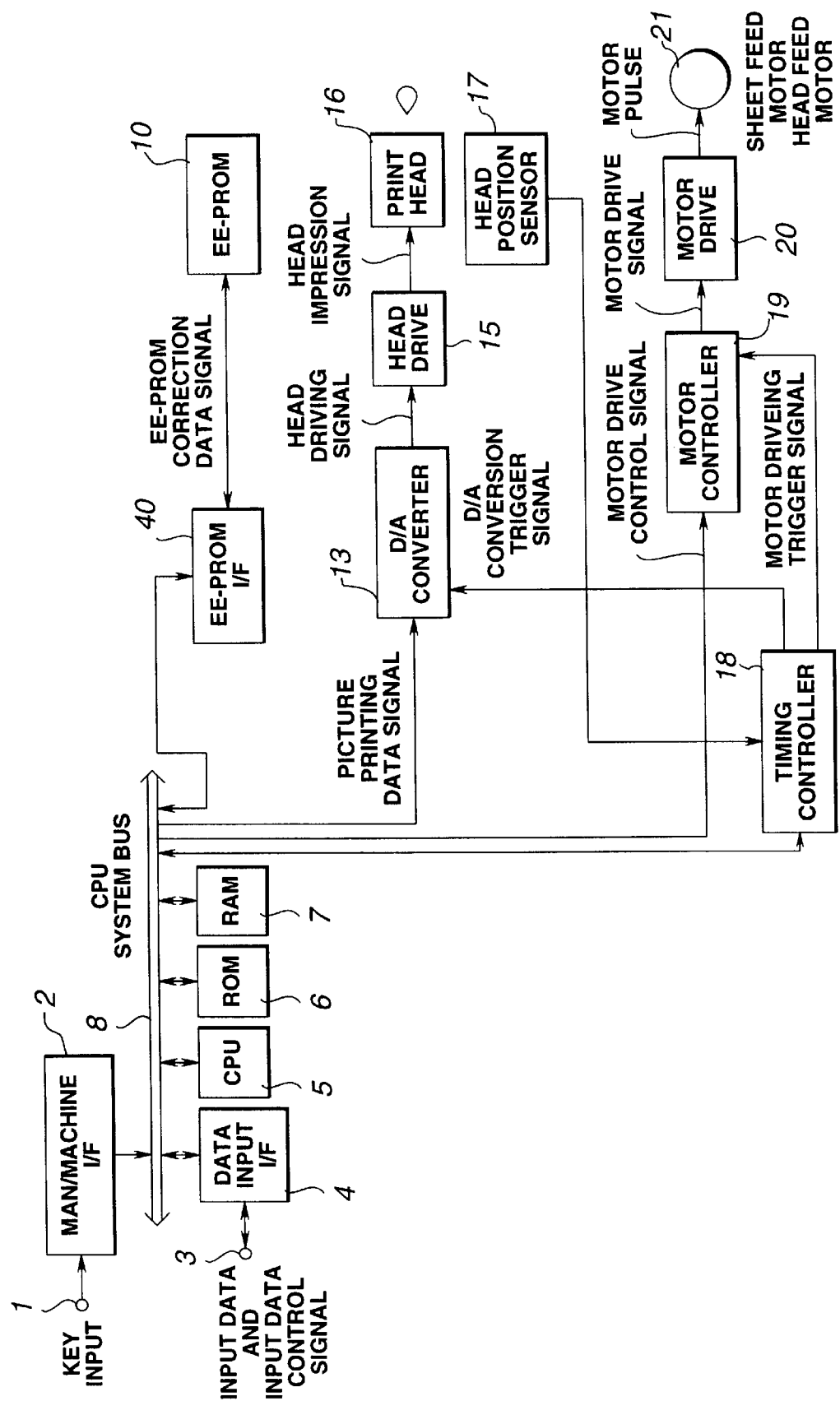
FIG. 17 is a schematic block circuit diagram of a printer apparatus according to a third embodiment of the present invention.

FIG. 17 shows a printer apparatus according to a third embodiment of the present invention. The parts or components similar to those shown in FIG. 3 are depicted by the same reference numerals.

Similarly to the above-described first embodiment, the thirds embodiment of the printer apparatus has a print head 16 capable of producing a desired half-tone print using the ink dot diameter modulation method. Moreover, in the present third embodiment, correction of fluctuations caused during production of the individual nozzles of the print head 16 or with lapse of time is executed by a digital processor controlling the print head. The print head of the present third embodiment employs the above-mentioned flat plate vibrator type multi-nozzle structure as an illustrative construction of the print head 16.

In the arrangement of the present third embodiment, similarly to the first embodiment, the relation between the impressed voltage level across the piezo element as the electrostrictive element on one hand and the distribution of the density in the dots formed on the recording sheet and the dot shape on the other hand is found for each nozzle of the print head at the time of manufacture of the print head as modulation characteristics of the print head by a standard testing device, that is a device the design value of which can be set, and the modulation characteristics thus found are converted into numerical measured values. These measured values per se or data found from these measured values are generated as shading correction data. Alternatively, the measured values may be attached to the print head at the time of sale thereof so that the user purchasing the print head can enter the annexed set of the measured values when using the print head.

In the arrangement of the present third embodiment, similarly to the first embodiment, the discharge properties of the individual nozzles can be measured for dealing with changes with lapse of time of the print head 16 for correcting the shading of the individual nozzles based on the measured values. The shading correction data of the individual nozzles may be found on the basis of the printed output of the picture printing sample for shading correction or by automatically measuring the ink density or the size of the ink dot deposited on the recording sheet or the flying ink droplets.

The shading correction in the third embodiment may be applied not only to the multi-color print head having plural nozzles for respective colors but also to an ink jet print head having a sole single-color nozzle as in the first embodiment. In addition, the shading correction in the present third embodiment may be applied to a multi-color ink jet print head having a multi-color single nozzle or to an ink jet print head having a single color multi-head. In the present third embodiment, a heating element may be used as ink emitting means in place of the electrostrictive vibrator. In this case, the power applied to the heating element and its waveform may be changed responsive to data to be printed for controlling the heating quantity, while the volume of the ink solution to be emitted may be changed by pressure changes caused by vaporization of the ink solution due to such heating for providing a desired half-tone print.

In the present third embodiment, shading correction for the respective nozzles of the print head is done by a digital processor controlling the print head. However, in a more simplified manner, the shading correction data may be found by the following method.

For example, if the printing data to be printed is D, the corrected printing data is D', the maximum value of the original printing data is Dmax and if the printing data actually outputted on application of Dmax to the print head as impression means, under assumption that the ink diameter undergoes no fluctuations, is D'max, the corrected printing data is given by the equation (3):

$$D' = (Dmax/D'max) \times D \tag{3}$$

The range of variation of the corrected printing data is clipped to a value that can be actually applied to the print head.

If the relation between the printing data to be printed D and the corrected printing data D' is the function of Dmax and D'max, the following equation (4):

$$D' = f(Dmax, D'max) \times D \tag{4}$$

holds.

As for the shading correction, if all half-tone values can be represented solely by the ink diameter modulation system, printing can be done solely by the ink diameter modulation system. If all half-tone values cannot be represented solely by the ink diameter modulation system, the dither method, exemplified by the so-called error diffusion method, may be used in conjunction with the ink diameter modulation system.

Among the materials usable as the electrostrictive vibrator, there are, for example, piezo-electric ceramics, made up of lead titanate zirconate ($PbTiO_3.PbZrO_3$) or barium titanate ($BaTiO_3$), quartz and Rochelle salt. If the heating element is used in place of the electrostrictive vibrator, an edge shooter type heating element or a side shooter type heating element may be used depending on the orientation of the heating element and the method of emitting liquid ink droplets.

Figure 18:
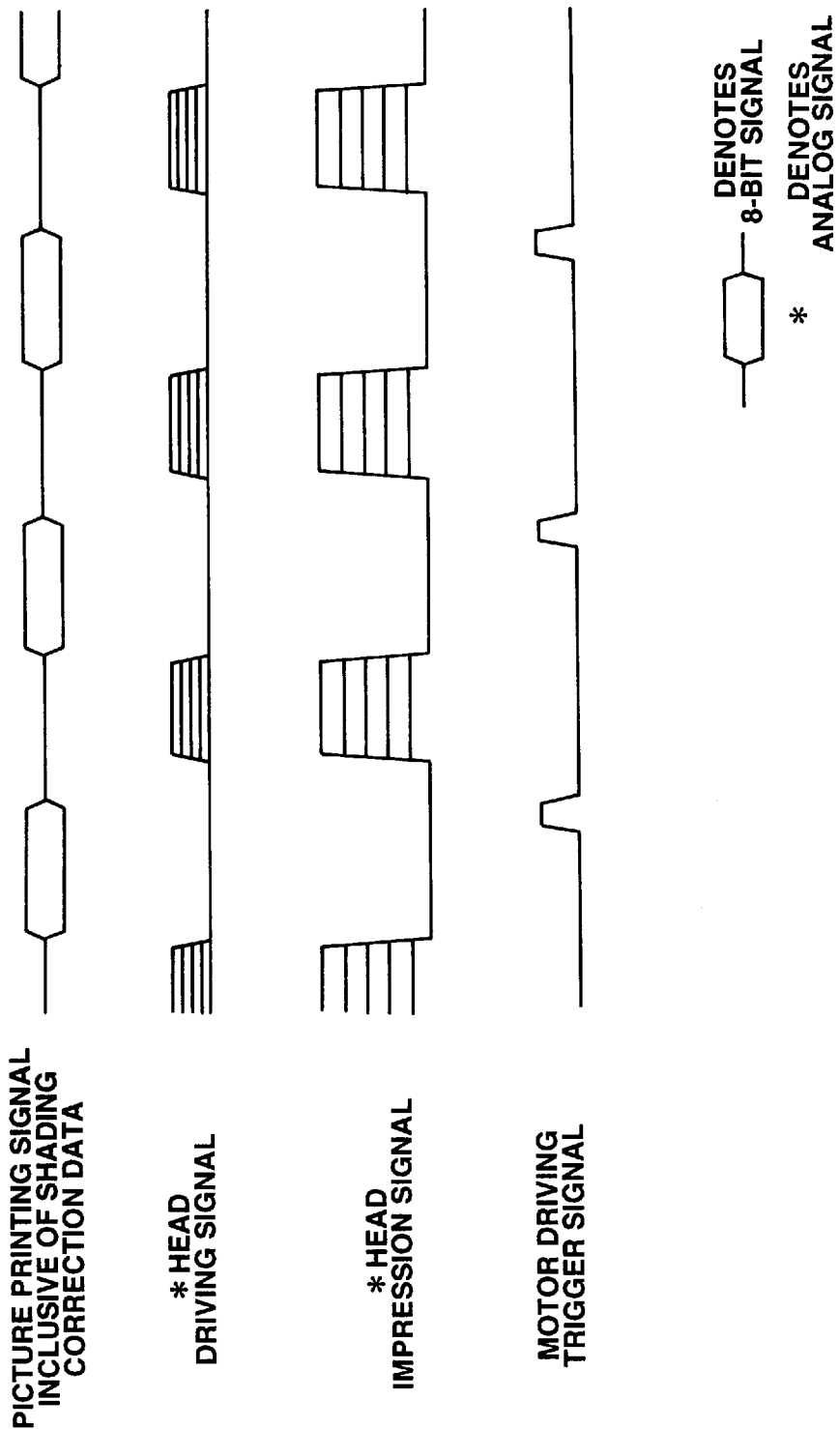
FIG. 18 is a timing chart for illustrating the operating timing of various components of the third embodiment of the printer apparatus.

The construction and the operation of the third embodiment of the printer apparatus will be explained by referring to the timing chart for various parts shown in FIG. 18. The parts or components similar to those shown in FIG. 3 are not explained for clarity.

If the print start request signal is supplied to the third embodiment of the printer apparatus, the printer apparatus reads out the shading correction data from the EE-PROM 10 via EE-PROM interfacing unit 40 for storage on the RAM 7. The shading correction data has been stored in the EE-PROM 10 so as to be used for actual printing. The picture data for printing is received via the data input interfacing unit 4 and stored in the RAM 7. At this time, the data interfacing unit 4 controls the inputting of the picture data so that no overflow in the RAM 7 will be incurred.

When the picture data for printing, stored in the RAM 7, has reached several lines, it is replaced by the printing data by the processing by the CPU 5. The printing data thus substituted is corrected for shading using the shading correction data stored in the RAM 7 so as to be used for actual printing. The actual printing data, thus corrected for shading, are stored in other places in the same RAM 7. The operations of the equation (3) are executed for the printing data correction operation employing the shading correction data.

When a number of the printing data corresponding to the number required for driving the print head has been stored in the RAM 7, the CPU 5 reads out the printing data stored in the RAM 7 to route the read-out printing data to the D/A converter 13, while routing a motor driving control signal to the motor controller 19, as in the first embodiment described above. The operation subsequent to the motor control unit 19 is the same as that of the first embodiment.

When fed from the timing controller 18 with the D/A conversion trigger signal similar to that described previously, the D/A converter 13 is responsive to the D/A conversion trigger signal to convert the corrected picture printing data signals from the RAM 7 into a voltage level and a current value corresponding to the signal values. The signals from the D/A converter 13 are sent as picture printing signal to the head driving unit 15. The operation downstream of the head driving unit is the same as that in the first embodiment. The head driving signal, head impression signal and the motor driving trigger signal are as shown in FIG. 18.

By the repetition of the above operations, thee occur paper feed, head feed and voltage impression across the head.

Figure 19:
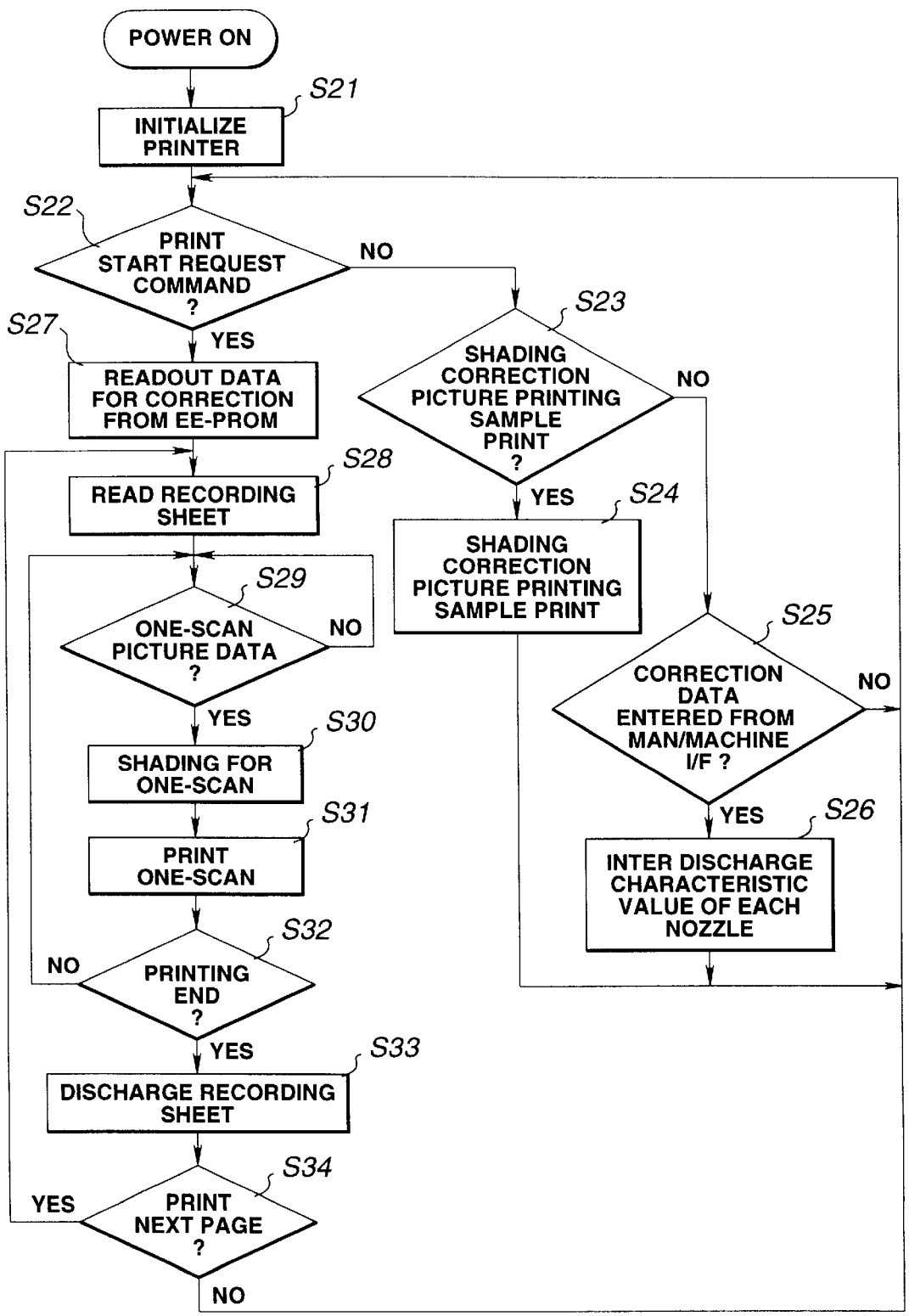
FIG. 19 is a flowchart showing the operation in the third embodiment of the printer apparatus.

The processing flow of the printing operation in the above-described third embodiment of the printer apparatus is as shown in the flowchart of FIG. 19. The operation from step S21 to step S26 in FIG. 19 is the same as that from step S1 to step S6 in the flowchart of FIG. 5 and hence the description is omitted for clarity.

If it is judged at step S22 in the flowchart of FIG. 19 that the printing start request command signal has been entered, processing transfers to step S27 ff. At step S27, the shading correction data is read from the EE-PROM 10. At the next step S28, the recording sheet is supplied. At the next step S29, it is judged whether or not one-scan picture data has been stored in the RAM 7. If it is found at step S29 that the one-scan data has not yet been stored, the operation for step S29 is repeated. If it is found that the one-scan data has been stored, processing transfers to step S30, where picture printing data is substituted for the one-scan picture data and processed for shading using the shading correction data read out from the EE-PROM 10.

At step S31, one-scan printing is done using the picture printing data. At step S32, it is judged whether or not printing has come to a close. If the result of judgment in step S29 is NO, processing reverts to step S29. If the result of judgment at step S29 is YES, processing transfers to step S33. At step S33, the recording sheet is discharged. At the next step S34, it is judged whether or not the next page is to be printed. If the next page is to be printed at step S34, processing reverts to step S28 and, if otherwise, processing reverts to step S22.

The shading correction data stored in the EE-PROm 10 in the present third embodiment and the shading correction data entered from the man/machine interfacing unit 2 are the same as those in the first embodiment described above. However, in the present third embodiment, if there is an input from the man/machine interfacing unit 2, the picture printing data stored in the RAM 7 is corrected, using both the shading correction data in the EE-PROM 10 and the corrected values of the shading correction data from the man/machine interfacing unit 2. That is, the shading correction data entered from the man/machine interfacing unit 2 are immediately stored in the EE-PROM 10 at a time point when the corrected value of the data has been entered. The correction data required for printing is found from both the data for correction inherently stored in the EE-PROM 10 and new correction data entered from the man/machine interfacing unit 2. For finding the correction data, the formula for calculation of (value s of data in the EE-PROM) −(number of times of pressing of the key K+)−(number of times of pressing of the key K−) is use ed.

Figure 20:
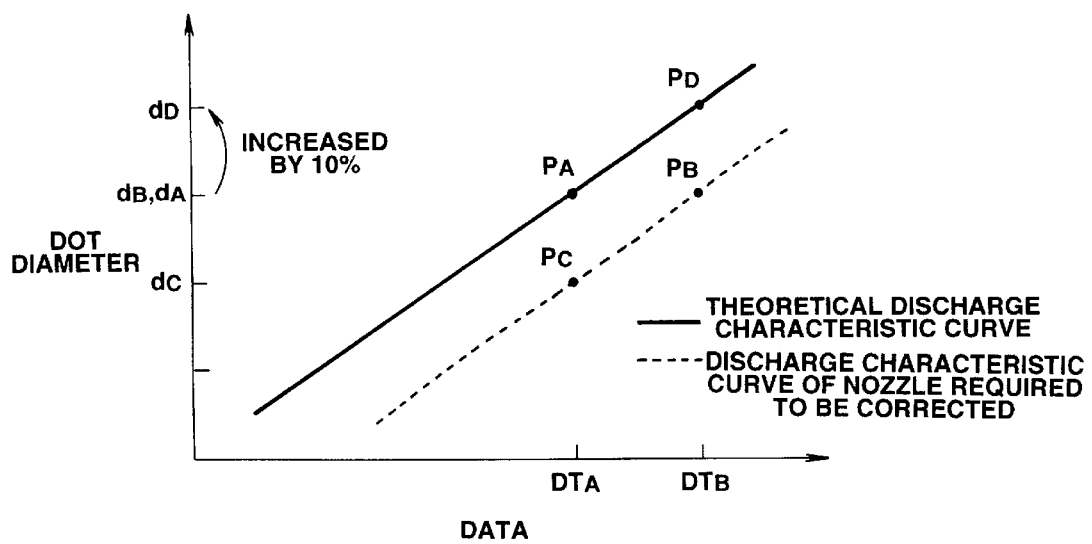
FIG. 20 is a graph for illustrating the relation between the dot diameter and the impressed voltage at the time of shading correction in the third embodiment of the printer apparatus.

Referring to FIG. 20, the relation between the design emitting characteristic values of the print head 16 on one hand and the values of the shading correction data ultimately obtained from the shading correction data supplied from the man/machine interfacing unit 2 and the correction value of the shading correction data from the EE-PROM 10, on the other hand, is explained. FIG. 20 is similar to FIG. 5 except that the abscissa indicates data.

That is, a point PA on the design ink-emitting characteristic curve, drawn with a solid line in FIG. 20, indicates that the value of the picture printing data which gives a design dot diameter dA for the maximum input level 255 is DTA. In FIG. 20, a point PC on the ink-emitting characteristic curve, drawn with a broken line, indicates that a diameter of a dot emitted from the nozzle and deposited on the recording paper is dC for the picture printing data value of DTA as in the case of the point PA on the design characteristic curve for the maximum input level 255. The above nozzle is such a nozzle in need of shading correction and which becomes optimum for the emitting characteristic value for correction equal to +10. Therefore, if it is desired in the nozzle in need of shading correction to obtain the same dot diameter dA as that for the point PA on the design characteristic curve, the dot diameter dB equal to the dot diameter dA may be obtained by employing a dot diameter dD larger by 10% than the dot diameter dA at the point PA on the design curve, that is the picture printing data DTB which will give the point PD on the design curve and which corresponds to a point PB on the characteristic curve indicated by a broken line in FIG. 18.

The same holds for the input level lower than 255 (<255). The design value of the picture printing data is first found from the input level (0 to 255), using an experimentally found ink-emitting characteristic curve for the nozzle in need of shading correction (a broken line curve in FIG. 18), and a design ink-emitting characteristic curve. The correction value for correcting the design picture printing data value is then found from the difference between the design curve and the actual ink-emitting characteristic curve. However, if the range of the ultimately obtained printing picture data exceeds the range that can be entered in the D/A converter 13, the possible inputting range is clipped at a value closest to the picture printing data.

The relation between the ink dot diameter and the picture printing density is similar to that explained in connection with the first embodiment, that is, the optical density OD of the print sample printed by a nozzle having design emitting properties is previously found by experiments and, based on this optical density, the relation between the picture printing density and the input level (0 to 255) in the ideal nozzle along the curve is found.

Figure 21:
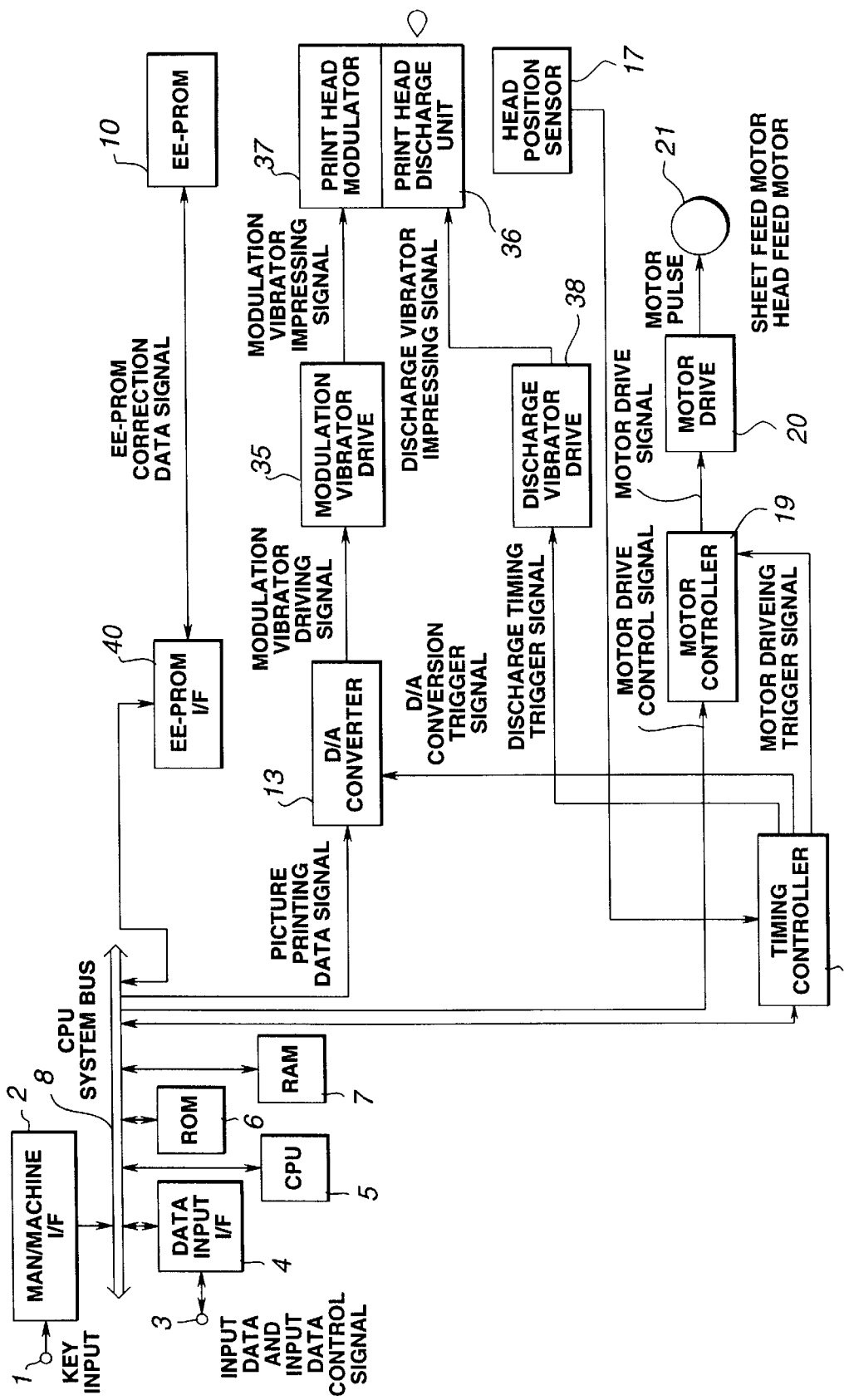
FIG. 21 is a schematic block circuit diagram of a printer apparatus according to a fourth embodiment of the present invention.

FIG. 21 shows a fourth embodiment of the printer apparatus having a print head for obtaining a desired half tone print using, as in the above-described second embodiment, a multi-density ink mixing type ink dot density modulating method (intra-ink-dot density modulation method) quantitating the density of the emitted ink droplets. The printer apparatus is adapted for carrying out shading correction for correcting fluctuations caused with lapse of time or during manufacture of the individual nozzles of the print head in a digital processor controlling the print head. The parts or components similar to those shown in FIGS. 12 and 17 are denoted by the same reference numerals and the corresponding description is omitted for clarity.

In the present fourth embodiment of the printer apparatus, the shading correction data as found during manufacture of the print head is stored in the memory means as explained previously or attached to the print head put on sale. In addition, it is possible to enter the shading correction data for the individual nozzles for coping with changes caused to the print head with lapse of time.

The arrangement of FIG. 21 is now explained. The shading-corrected picture printing data, read out from the RAM 7 of the printer apparatus, is stored on other sites in the RAM 7. The shading-corrected picture printing data, read out from the RAM 7, is sent to the D/A converter 13. When fed from the timing controller 18 with the D/A conversion trigger signal from the timing controller 18, the D/A converter 13 converts the corrected picture printing data from the RAM 7 into voltage and current values corresponding to the signal values. An output signal of the D/A converter 13 is sent as a modulation vibrator driving signal to the modulation vibrator driving unit 35. The construction and the operation downstream of the modulation vibrator driving unit 35 is similar to that explained in connection with the second embodiment.

The emitting vibrator driving unit 38 sends to the print head emitting unit 36 an emitting vibrator impression signal corresponding to the emitting timing signal from the timing controller 18, as in FIG. 12. The emitting unit 36 mixes the dilution solution with the ink quantitated by the print head modulation unit 37 and emits the ink at the ink emitting orifice 156. This forms an ink dot of desired density on the recording sheet. The construction and the operation of the fourth embodiment is otherwise the same as that of the second embodiment.

Figure 22:
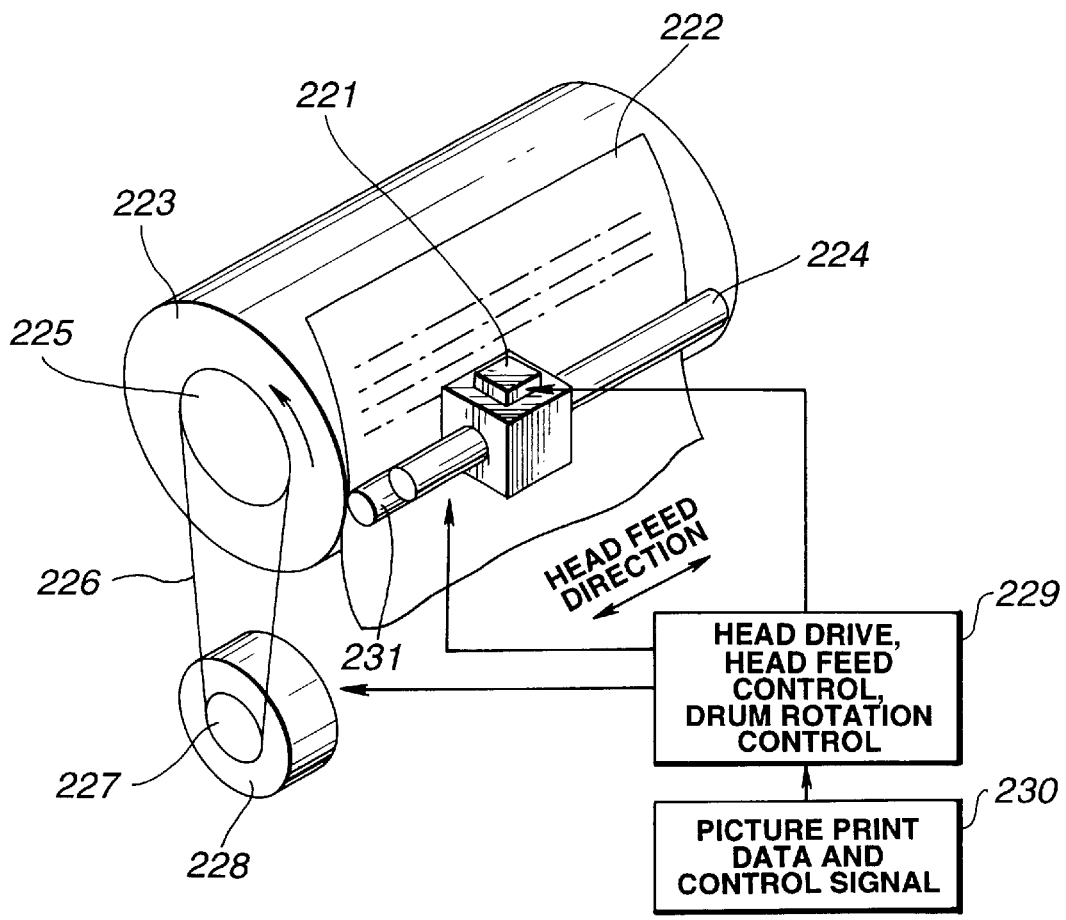
FIG. 22 illustrates the schematic structure of a serial type ink jet printer apparatus according to a fourth embodiment of the present invention.
Figure 23:
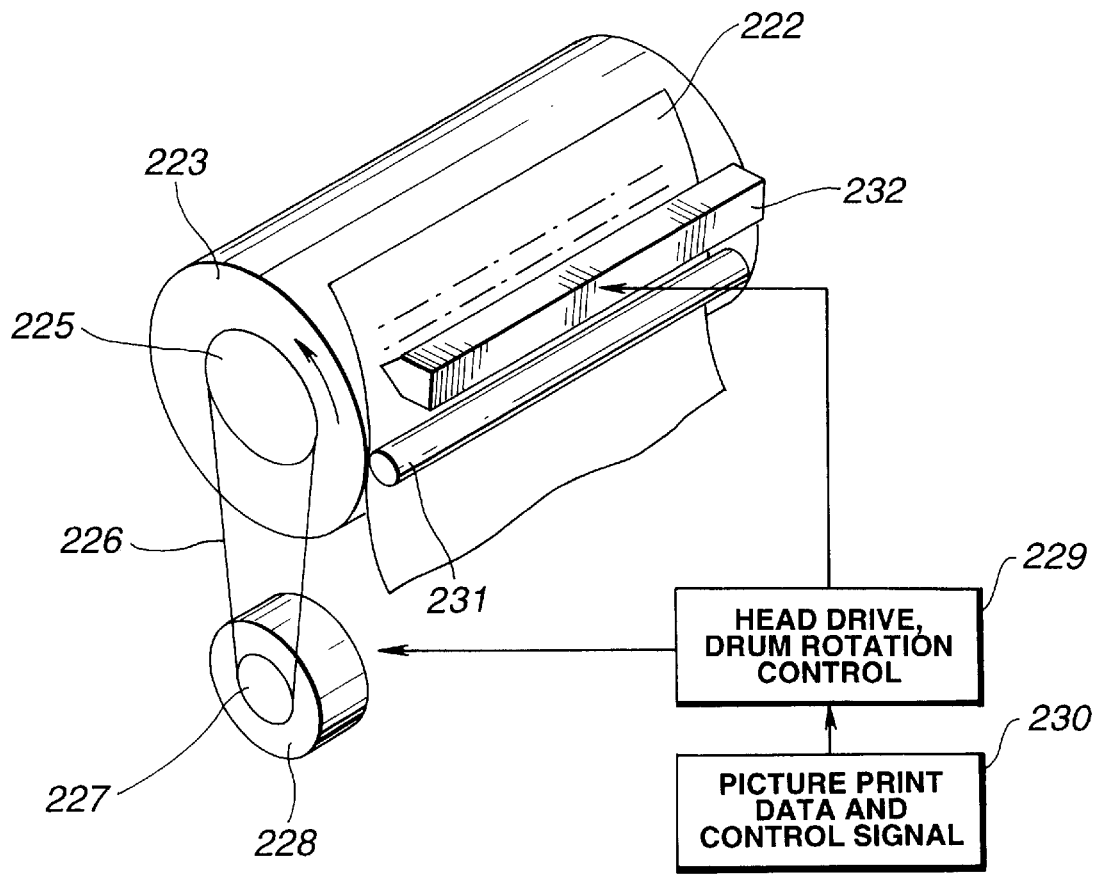
FIG. 23 illustrates the schematic structure of a line type ink jet printer apparatus.

The construction of actual driving portions of the printer apparatus, employing a print head of any one of the above-described embodiments, is explained by referring to FIGS. 22 and 23.

FIG. 22 shows an arrangement of a so-called serial printer apparatus as typical of the head driving type printer. In FIG. 22, a printing sheet 222, as a printing support, is thrust against a drum 223 by a sheet pressing roll 231 provided parallel to the axis of a drum 223. On the outer periphery of the drum 223 is mounted a feed screw 224 parallel to the drum axis. A print head portion 221 is held by the feed screw 224. Rotation of the feed screw 224 axially shifts the print head portion 221. The drum 223 is run in rotation by a motor 228 via pulley 225, belt 226 and pulley 227. Rotation of the feed screw 224 and the motor 228 and driving of the print head 221 are controlled by a driving controller 229 which in turn is controlled by picture printing data and a control signal from a printing data and control signal generator 230. If, in the above arrangement, the print head 221 is moved for printing one line, the drum 223 is rotated by one line for printing the next line. The print head 221 may be moved in one direction only, or in both directions.

FIG. 23 shows an illustrative structure of a driving portion of a line type printer apparatus. In FIG. 23, the parts or components similar to those shown in FIG. 22 are denoted by the same reference numerals and the corresponding description is omitted for clarity. In FIG. 23, a line head 232, having a large number of heads arranged in a line configuration, is axially secured, in place of the serial type head and the feed screw shown in FIG. 23. In the present arrangement, one-line printing is done simultaneously and, on completion of printing, the drum 223 is rotated by one line for printing the next line. The entire lines may be printed at a time or divided into plural blocks.

With the above-described printer apparatus according to the present invention, manufacture tolerances of the individual nozzles of the ink jet print head may be corrected and the picture printing gradation level may be made more accurate without lowering the effective resolution for assuring printing of the input picture data with accurate and uniform quality. Moreover, it is possible to deal with fluctuations in the ink-emitting properties of the individual nozzles during manufacture of the ink jet print head within an range that can be covered by the shading correction according to the present invention, thus enabling the head to be produced at lower cost. In addition, it is possible to correct fluctuations in the individual nozzles by a simplified circuit structure. Since processing is done in a digital processor, circuit integration may be facilitated, while processing can be achieved solely by the CPU software.

Although the ink is quantitated and the dilution solution is emitted in the above-described second and fourth embodiments, the dilution solution may be quantitated, while the ink may be emitted for achieving the same effect. In such case, the structure and the operation may be arranged similarly to that of the previous embodiments. Although pale-colored dots appear less sharply, sufficient ink density may be realized for the shadow portion.

We claim:

1. A printer apparatus for printing a half-tone picture by varying the diameter of an ink dot formed on a recording medium, comprising:

a plurality of pressure chambers into which an ink is introduced;

a plurality of nozzles respectively communicating with a plurality of said pressure chambers;

a plurality of pressurizing means provided in association with said nozzles and adapted for pressurizing the ink in said pressure chambers;

means for inputting a picture printing signal;

analog picture printing signal conversion means for analogically converting the input picture printing signal;

memory means for storing a correction value which renders ink-emitting properties of said pressurizing means uniform;

analog correction value conversion means for analogical conversion of said correction value; and head driving condition setting means for setting the head driving conditions by said correction value and said picture printing signal as converted by analog picture printing conversion means and by said analog correction value conversion means, respectively.

2. A printer apparatus for printing a half-tone picture by varying the mixing density of a medium for quantitation and a medium for emission, comprising:

a plurality of first pressure chambers into which a medium for emission is introduced;

a plurality of second pressure chambers into which a medium for quantitation is introduced;

a plurality of first nozzles respectively communicating with said first pressure chambers;

a plurality of second nozzles respectively communicating with said second pressure chambers and respectively arranged in proximity to said first nozzles;

a plurality of first pressurizing means arranged in association with said first nozzles and adapted for pressurizing the medium for emission in said first pressure chamber responsive to a picture printing signal;

a plurality of second pressurizing means arranged in association with said second nozzles and adapted for pressurizing the medium for emission in said second pressure chamber responsive to a picture printing signal;

means for inputting a picture printing signal;

analog picture printing signal conversion means for analogically converting the input picture printing signal;

memory means for storing a correction value which renders ink-emitting properties of at least one of the first pressurizing means and the second ink pressurizing means uniform;

analog correction value conversion means for analog conversion of said correction value; and head driving condition setting means for setting the head driving conditions by said correction value and said picture printing signal as converted by analog correction value conversion means and by said analog picture printing signal conversion means, respectively.

3. The printer apparatus as claimed in claim 2 wherein said medium for quantitation is ink and said medium for emission is a dilution solution.

4. The printer apparatus as claimed in claim 2 wherein said medium for emission is ink and said medium for quantitation is a dilution solution.

* * * * *